US012748428B2

(12) United States Patent
Hatakeyama

(10) Patent No.: US 12,748,428 B2
(45) Date of Patent: Sep. 29, 2026

(54) DEVICE AND SYSTEM

(71) Applicant: Sony Group Corporation, Tokyo (JP)

(72) Inventor: Kouichi Hatakeyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 105 days.

(21) Appl. No.: 18/707,954

(22) PCT Filed: Oct. 20, 2022

(86) PCT No.: PCT/JP2022/039015
§ 371 (c)(1),
(2) Date: May 7, 2024

(87) PCT Pub. No.: WO2023/085027
PCT Pub. Date: May 19, 2023

(65) Prior Publication Data
US 2024/0427341 A1 Dec. 26, 2024

(30) Foreign Application Priority Data
Nov. 15, 2021 (JP) ................................ 2021-185814

(51) Int. Cl.
*G05D 1/222* (2024.01)
*G05D 109/20* (2024.01)

(52) U.S. Cl.
CPC ......... *G05D 1/222* (2024.01); *G05D 2109/20* (2024.01)

(58) Field of Classification Search
CPC ............... G05D 1/222; G05D 2109/20; G05D 2101/15; G05D 1/2232; G05D 2109/254;
(Continued)

(56) References Cited

U.S. PATENT DOCUMENTS

2014/0129047 A1* 5/2014 Barrett .................. H04W 4/046 701/1
2014/0297067 A1* 10/2014 Malay .................... G01C 9/005 701/4
(Continued)

FOREIGN PATENT DOCUMENTS

CN 108423164 A 8/2018
JP 2017-208678 A 11/2017
(Continued)

OTHER PUBLICATIONS

International Search Report and Written Opinion mailed on Dec. 6, 2022, received for PCT Application PCT/JP2022/039015, filed on Oct. 20, 2022, 8 pages including English Translation.
(Continued)

*Primary Examiner* — Dale W Hilgendorf
*Assistant Examiner* — Frank T Glenn, III
(74) *Attorney, Agent, or Firm* — XSENSUS LLP

(57) ABSTRACT

A device is a device mounted on a moving body and configured to control the moving body. The device includes a holding unit and a control unit. The holding unit holds an information processing device that controls the moving body. The control unit is configured to acquire control information used to control the moving body from the information processing device, and to control the moving body based on the control information.

13 Claims, 10 Drawing Sheets

(58) Field of Classification Search
CPC .... G05D 1/2247; G05D 1/226; G05D 1/2295; G05D 1/644; B64D 47/08; B64U 50/19; B64U 2101/30; B64U 2201/00; B64C 39/02
See application file for complete search history.

(56) References Cited

U.S. PATENT DOCUMENTS

| | | | | |
|---|---|---|---|---|
| 2016/0376004 | A1* | 12/2016 | Claridge | A63H 27/12 701/3 |
| 2017/0066530 | A1* | 3/2017 | Salzmann | G05D 1/0094 |
| 2018/0102143 | A1* | 4/2018 | Allison | G06V 20/49 |
| 2022/0001971 | A1* | 1/2022 | McKeehan | B64U 20/50 |
| 2022/0276851 | A1* | 9/2022 | Nakahara | G07C 5/085 |
| 2024/0045421 | A1* | 2/2024 | Yang | G05D 1/0088 |

FOREIGN PATENT DOCUMENTS

| | | | |
|---|---|---|---|
| KR | 101615319 | B1 | 4/2016 |
| WO | 2018/003032 | A1 | 1/2018 |
| WO | WO-2020105898 | A1 | 5/2020 |
| WO | 2021/005782 | A1 | 1/2021 |

OTHER PUBLICATIONS

"Flone, a flying phone, is the winning 1-6 B64C13/20 project of the call Next Things 2013", Internet Citation, Apr. 16, 2013 (Apr. 16, 2013), pp. 1-3, XP002726059.
Isuru V A et al: "Reusing discarded-smartphone capabilities on quadcopters: The rationale, benefits and issues", 2016 Sixteenth International Conference on Advances in ICT for Emerging Regions (ICTER), IEEE, Sep. 1, 2016 (Sep. 1, 2016), pp. 229-236, XP033049670.
Muller Matthias et al: "OpenBot: Turning Smartphones into Robots", 2021 IEEE International Conference on Robotics and Automation (ICRA), IEEE, May 30, 2021 (May 30, 2021), pp. 9305-9311, XP033990271.

* cited by examiner

DEVICE AND SYSTEM

CROSS-REFERENCE TO RELATED APPLICATIONS

The present application is a national stage application, pursuant to 35 U.S.C. § 371, of International Patent Application No. PCT/JP2022/039015, filed Oct. 20, 2022, which claims priority from Japanese Patent Application No. 2021-185814, filed Nov. 15, 2021, the entire contents of each are incorporated herein by reference.

FIELD

The present disclosure relates to a device and a system.

BACKGROUND

A technology for remotely operating a moving body is known. For example, a technology that enables a user to remotely operate a drone by using a smartphone is known.

CITATION LIST

Patent Literature

Patent Literature 1: JP 2017-208678 A

SUMMARY

Technical Problem

For example, when a drone is remotely operated, a remote operation is performed by any one of a non-visual flight in which the drone is flown in a state in which the drone cannot be directly checked and an in-visual flight in which the drone is flown in a state in which the drone can be directly checked.

When the drone is operated in the non-visual flight, more advanced autonomous flight is required. Specifically, the drone is required to have, for example, a function of avoiding an obstacle faster without deviating from a preset flight route.

As described above, a more advanced autonomous movement function is required for a moving body such as the drone operated by remote operation. However, in order to further improve performance of the moving body, development costs are required. In addition, there is a problem in that it is difficult to improve performance of an existing moving body.

Therefore, the present disclosure provides a mechanism capable of more easily achieving high performance of the moving body.

It is noted that the above problem or object is merely one of a plurality of problems or objects that can be solved or achieved by a plurality of embodiments disclosed in the present specification.

Solution to Problem

A device of the present disclosure is a device mounted on a moving body and configured to control the moving body. The device includes a holding unit (310) and a control unit. The holding unit holds an information processing device that controls the moving body. The control unit is configured to acquire control information used to control the moving body from the information processing device, and to control the moving body based on the control information.

DESCRIPTION OF EMBODIMENTS

Figure 1:
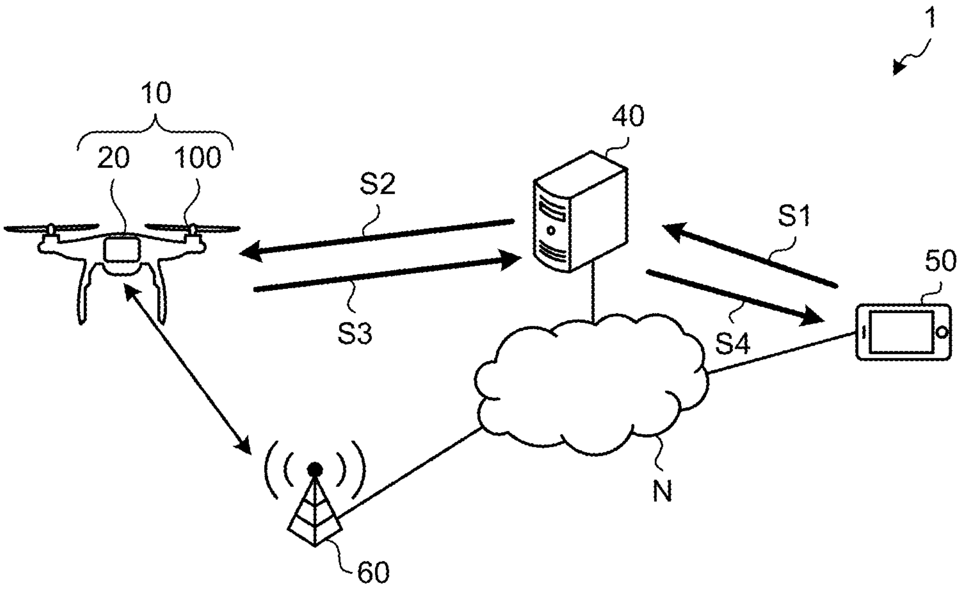
FIG. 1 is a diagram illustrating a configuration example of a moving body system according to an embodiment of the present disclosure.

Hereinafter, embodiments of the present disclosure will be described in detail with reference to the accompanying drawings. It is noted that, in the present specification and the drawings, components having substantially the same functional configuration are denoted by the same reference numerals, and redundant description is omitted.

In addition, in the present specification and the drawings, a plurality of components having substantially the same functional configuration may be distinguished by attaching different numbers or alphabets after the same reference numeral. However, when it is not particularly necessary to distinguish each of the plurality of components having substantially the same functional configuration, the same reference numeral is assigned thereto.

Furthermore, in the present specification and the drawings, specific values may be indicated for description, but the values are merely examples, and other values may be applied.

One or more embodiments (including examples and modifications) described below can each be implemented independently. On the other hand, at least some of the plurality of embodiments described below may be appropriately combined with at least some of other embodiments to be implemented. The plurality of embodiments may include novel features different from each other. Therefore, the plurality of embodiments can contribute to solving different objects or problems, and can exhibit different effects.

1. Introduction

<1.1. Outline of Moving Body System>

First, a description will be given as to an outline of a moving body system 1 according to an embodiment of the present disclosure. FIG. 1 is a diagram illustrating a configuration example of the moving body system 1 according to the embodiment of the present disclosure.

The moving body system 1 includes a moving body device 10, a server device 40, and a user-side information processing device 50.

The moving body device 10 includes, for example, a moving body such as a drone or a robot. Hereinafter, a case where the moving body is a drone will be described as an example, but the moving body is not limited to the drone. The moving body device 10 includes a drone 100 and a control device 20.

The control device 20 is mounted on the drone 100 and controls the drone 100 in accordance with an operation from the server device 40 or the user-side information processing device 50. The control device 20 is connected to a network N via a base station 60. The control device 20 will be described later.

The server device 40 is a device that manages and/or operates the drone 100 via the control device 20. The server device 40 is connected to the user-side information processing device 50 and the control device 20 via the network N. The server device 40 operates the drone 100 in accordance with an instruction from the user-side information processing device 50. Furthermore, the server device 40 transmits various types of information acquired from the drone 100 to the user-side information processing device 50.

The user-side information processing device 50 is, for example, a terminal device such as a smartphone. For example, the user-side information processing device 50 receives an operation from a user and controls the drone 100 via the server device 40 based on the operation. The user-side information processing device 50 is connected to the server device 40 via the network N.

The base station 60 is a communication device that performs, for example, radio communication with the control device 20. The base station 60 communicates with the control device 20 by a cellular communication technology such as a 5th generation mobile communication system (5G) or long term evolution (LTE). The base station 60 may be, for example, an access point that communicates with the control device 20 by a radio communication method such as Wi-Fi (registered trademark). The base station 60 may be, for example, a communication device that communicates with the control device 20 by a radio communication method such as Bluetooth (registered trademark).

Figure 2:
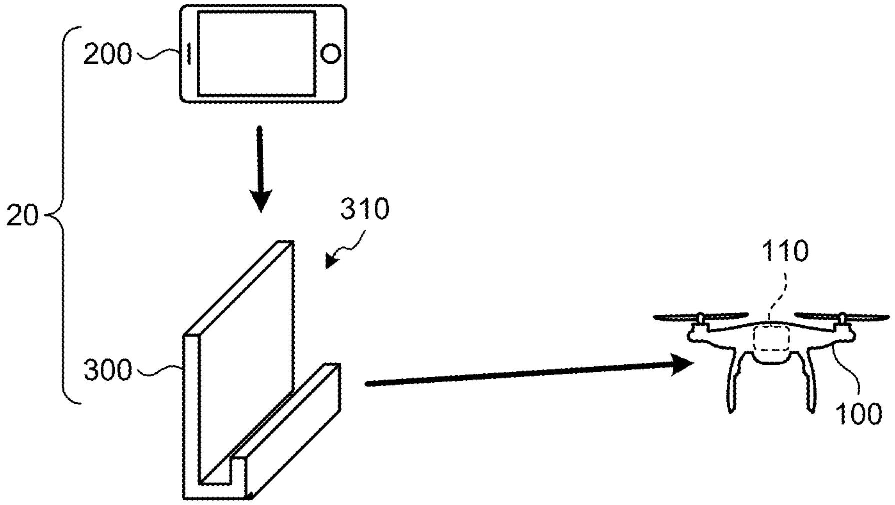
FIG. 2 is a diagram illustrating an example of a control device according to the embodiment of the present disclosure.

FIG. 2 is a diagram illustrating an example of the control device 20 according to the embodiment of the present disclosure. As illustrated in FIG. 2, the control device 20 includes a drone-side information processing device 200 and an external device 300.

The drone-side information processing device 200 is, for example, a terminal device such as a smartphone. The drone-side information processing device 200 has, for example, a high-performance processing function and a communication function. The drone-side information processing device 200 has various sensors mounted therein, such as a camera. The drone-side information processing device 200 can perform, for example, highly secure communication (for example, secure sockets layer (SSL) communication).

The drone-side information processing device 200 is mounted on, for example, the external device 300.

The drone-side information processing device 200 is connected to the network N via the base station 60. The drone-side information processing device 200 controls the drone 100 via the external device 300 according to the operation on the drone 100 from the server device 40.

The external device 300 controls the drone 100 in accordance with an instruction from the drone-side information processing device 200. The external device 300 generates, for example, an ESC control signal for controlling an electric speed controller (ESC) to be described later. The external device 300 may, for example, generate various control signals for controlling the drone 100.

The external device 300 includes, for example, a holding unit 310. The holding unit 310 holds the drone-side information processing device 200. For example, the holding unit 310 can detachably hold the drone-side information processing device 200. It is noted that the holding unit 310 illustrated in FIG. 2 is an example. For example, the holding unit 310 may hold the drone-side information processing device 200 by causing the drone-side information processing device 200 to be fitted into the holding unit 310.

The external device 300 is mounted on, for example, a mounting unit 110 of the drone 100 in a state of holding the drone-side information processing device 200. Alternatively, the drone-side information processing device 200 may be mounted on the external device 300 in a state in which the external device 300 is fixed to the mounting unit 110 of the drone 100. It is noted that the mounting unit 110 of the drone 100 illustrated in FIG. 2 is an example. For example, the mounting unit 110 may be provided at an upper portion or a lower portion of the drone 100.

The external device 300 controls the drone 100 according to the control from the drone-side information processing device 200.

Referring back to FIG. 1, a description will be given as to an outline of remote operation processing of the drone 100 according to the embodiment of the present disclosure.

As illustrated in FIG. 1, the user-side information processing device 50 receives an operation of the drone 100 from a user, and transmits operation information on the operation to the server device 40 (Step S1).

The server device 40 transmits the operation information received from the user-side information processing device 50 to the drone-side information processing device 200 (refer to FIG. 2) of the control device 20 (Step S2). The drone-side information processing device 200 controls the drone 100 via the external device 300 based on the operation information.

The control device 20 illustrated in FIG. 1 transmits state information on the state of the drone 100 such as a location of the drone 100 and video information captured by the drone 100 to the server device 40 (Step S3).

The server device 40 transmits the state information and the video information received from the control device 20 to the user-side information processing device 50 (Step S4).

As described above, in the moving body system 1 according to the embodiment of the present disclosure, the drone-side information processing device 200 such as a smartphone is mounted on the drone 100 via the external device 300. As a result, the moving body system 1 can control the drone 100 using the drone-side information processing device 200 having a high-performance information processing function, such as a smartphone, and can more easily improve the performance of the moving body device 10 including the drone 100.

Furthermore, the moving body device 10 can be connected to the network N using, for example, the communication function of the drone-side information processing device 200. As a result, the moving body device 10 can be connected to the server device 40 via the network N. The moving body system 1 can remotely operate the drone 100 more easily.

Furthermore, since the user-side information processing device 50 can control the drone 100 via the network N, the user can control the drone 100 outside the eyes.

In this manner, in a case where non-visual flight of the drone 100 is performed, autonomous flight of the drone 100 is more required. For example, in the case of non-visual flight, the drone 100 is required to have a function of autonomously avoiding an obstacle that cannot be confirmed by the user in a video. Further, the drone 100 is required to have a function of avoiding an obstacle instantaneously without deviating from a preset flight route.

At this time, if the performance of the drone 100 itself is improved, the drone 100 itself becomes expensive. In addition, it is difficult to improve the performance of an existing drone.

Meanwhile, in the moving body system 1 according to the embodiment of the present disclosure, the drone-side information processing device 200 mounted on the drone 100 controls the drone 100. As described above, the drone-side information processing device 200 is an information processing terminal such as a smartphone. The smartphone is, for example, a high performance device having a sensor such as a camera or an inertial measurement unit (IMU) mounted thereon and executing various applications.

As described above, by allowing the high-performance information processing device to be mounted on the drone 100 as a module of the moving body device 10, the moving body system 1 according to the embodiment of the present disclosure can implement the autonomous flight of the drone 100 without enhancing the performance of the drone 100 itself. That is, the moving body system 1 according to the embodiment of the present disclosure can more easily achieve high performance of the moving body device 10 including the drone 100.

The moving body system 1 according to the embodiment of the present disclosure utilizes the multifunctionality of the drone-side information processing device 200 and combines the server device 40 and the drone-side information processing device 200, thereby implementing the functions required for the flight of the drone 100.

For example, in order to ensure the safety of flight by the drone 100, each device (for example, the drone 100, and the user-side and drone-side information processing devices 50 and 200) included in the moving body system 1 is required to be a device, the safety of which has been verified in advance.

Furthermore, in order for the drone 100 to fly, it is required to obtain permission regarding flight, such as a flight location and flight time, from a network operator, a country, a local government, or the like.

In order to satisfy these requirements, there is demand for a mechanism that allows the moving body system 1 to include the user-side and drone-side information processing devices 50 and 200 authorized by company or institution such as a network operator, a country or a local government.

Therefore, the moving body system 1 according to the embodiment of the present disclosure provides a mechanism configured to enable the specific drone-side information processing device 200 to control the drone 100 via the external device 300. Furthermore, the moving body system 1 according to the embodiment of the present disclosure provides a mechanism configured to enable the specific drone-side information processing device 200 to be connected to the server device 40. Furthermore, the moving body system 1 according to the embodiment of the present disclosure provides a mechanism configured to enable the specific user-side information processing device 50 to be connected to the server device 40.

By achieving such a mechanism, the moving body system 1 according to the embodiment of the present disclosure can cause the drone 100 to fly within a range where flight permission is obtained. Furthermore, the moving body system 1 according to the embodiment of the present disclosure can limit the flight of the drone 100 by a user who has not obtained permission. As a result, the moving body system 1 according to the embodiment of the present disclosure can cause the drone 100 to fly more safely.

2. Configuration Example of Moving Body System

<2.1. Configuration Example of Drone-Side Information Processing Device>

The drone-side information processing device 200 according to the embodiment of the present disclosure is an information processing device mounted on the drone 100 of the moving body system 1 via the external device 300 and configured to control the drone 100. The drone-side information processing device 200 is, for example, a portable information processing device such as a smartphone. As described above, the drone-side information processing device 200 according to the embodiment of the present disclosure indirectly controls the drone 100 via the external device 300, instead of directly controlling, for example, a motor or the like of the drone 100.

(Hardware Configuration Example of Drone-Side Information Processing Device 200)

Figure 3:
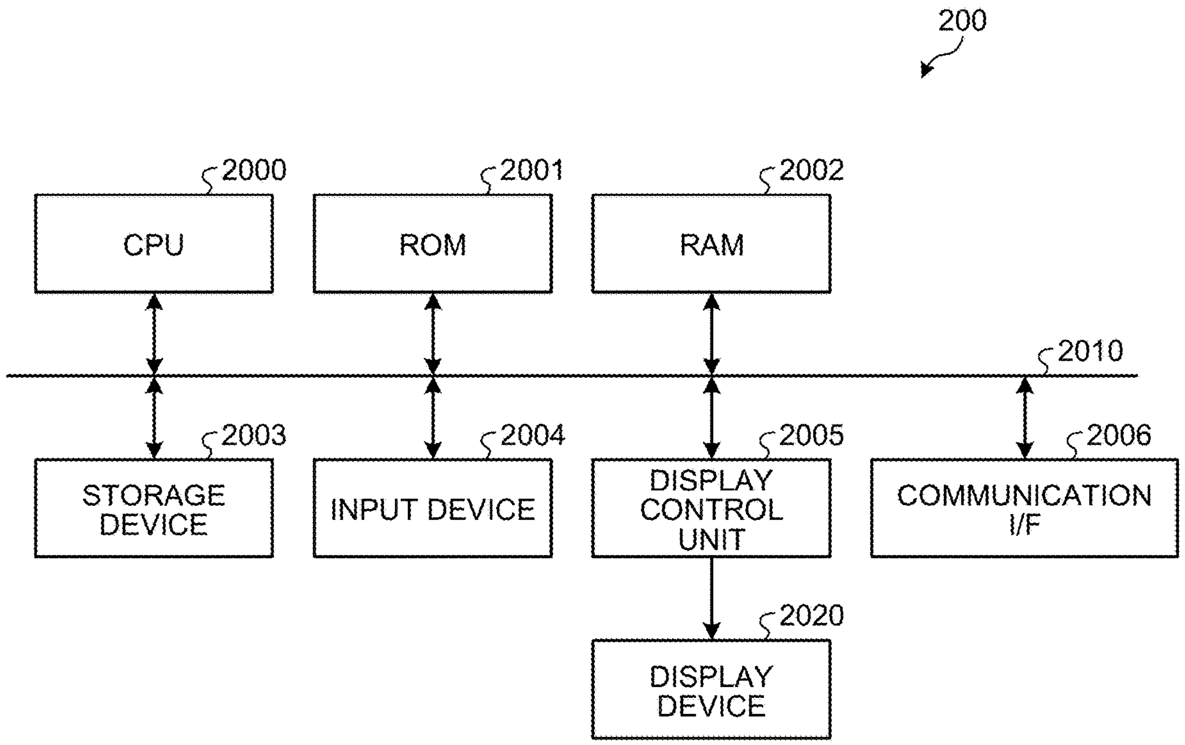
FIG. 3 is a block diagram illustrating an example of a hardware configuration of a drone-side information processing device according to the embodiment of the present disclosure.

FIG. 3 is a block diagram illustrating an example of a hardware configuration of the drone-side information processing device 200 according to the embodiment of the present disclosure.

In FIG. 3, the drone-side information processing [0050] device 200 includes a central processing unit (CPU) 2000, a read only memory (ROM) 2001, a random access memory (RAM) 2002, a storage device 2003, an input device 2004, a display control unit 2005, and a communication I/F 2006. The CPU 2000, the ROM 2001, the RAM 2002, the storage device 2003, the input device 2004, the display control unit 2005, and the communication I/F 2006 are communicably connected to each other via a bus 2010. Furthermore, in the example of FIG. 3, the drone-side information processing device 200 further includes a display device 2020 connected to the display control unit 2005.

The storage device 2003 is a non-volatile storage medium such as a hard disk drive or a flash memory. The storage device 2003 stores various programs and data for operation of the CPU 2000.

The CPU 2000 operates according to a program stored in advance in the ROM 2001 and the storage device 2003, and controls the entire operation of the drone-side information processing device 200. The communication I/F 2006 executes communication with the base station 60 under the control of the CPU 2000.

The input device 2004 generates a control signal according to a user operation. The generated control signal is transferred to the CPU 2000 via the bus 2010. The display control unit 2005 generates a display signal displayable by the display device 2020 based on a display control signal generated by the CPU 2000 according to the program, and outputs the display signal to the display device 2020. As the display device 2020, for example, a display device using a liquid crystal display (LCD) or organic electro-luminescence (EL) can be applied.

Here, for example, the input device 2004 may generate a control signal according to a contact location and transmit light, and the input device 2004 and the display device 2020 may be formed to be integrated with each other to constitute a touch panel.

A drone-side control application (an application program) and a drone-side service application to be described later are implemented by allowing, for example, a basic program (for example, an operating system (OS)) of the drone-side information processing device 200 to be operated on the CPU 2000. The present disclosure is not limited to this example, and a part or all of the drone-side control application and the drone-side service application may be configured using hardware circuits operating in cooperation with each other.

As actual hardware, for example, when the CPU 2000 reads and executes the application from a storage medium such as the storage device 2003, each application is loaded on a main storage device such as the RAM 2002, and each application is generated on the main storage device.

(Software Configuration Example of Drone-Side Information Processing Device 200)

Figure 4:
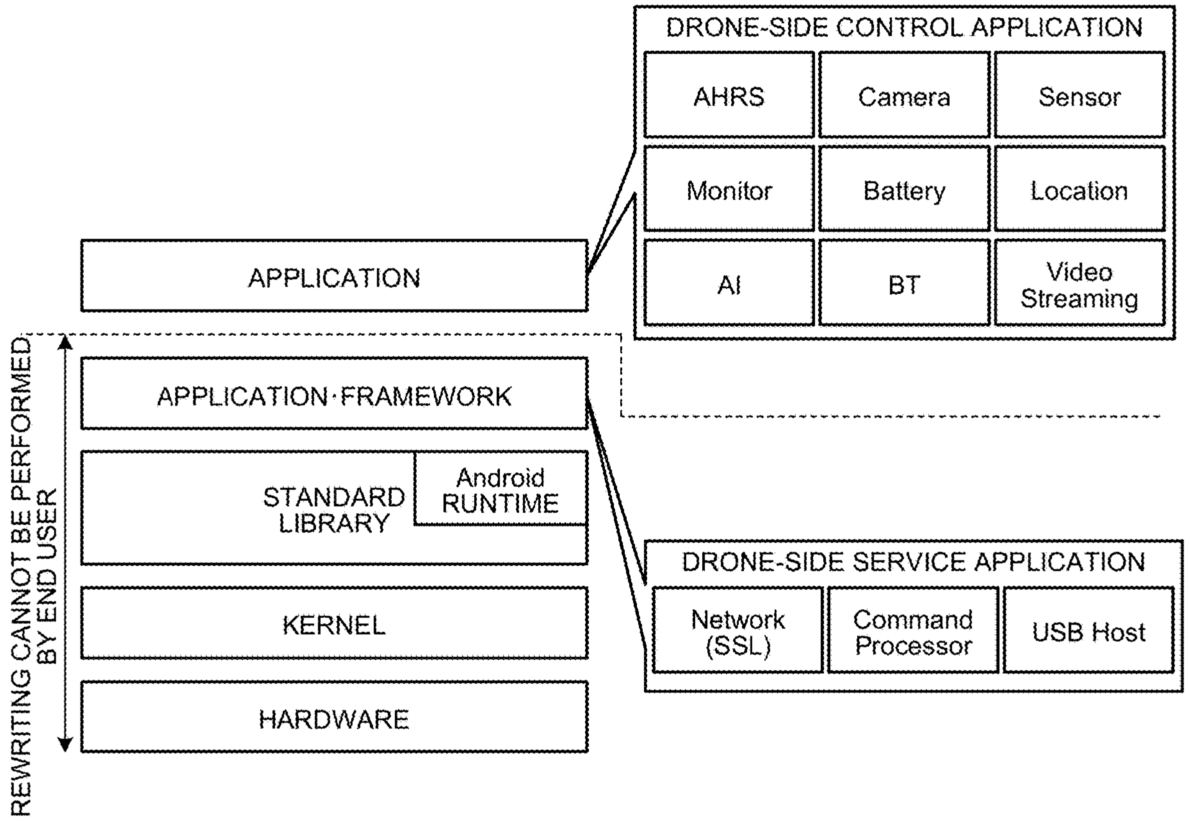
FIG. 4 is a diagram illustrating an example of a software configuration of the drone-side information processing device according to the embodiment of the present disclosure.

FIG. 4 is a diagram illustrating an example of a software configuration of the drone-side information processing device 200 according to the embodiment of the present disclosure. FIG. 4 illustrates a software configuration of an Android (registered trademark) OS as an example, but the present disclosure is not limited thereto. The drone-side information processing device 200 may be operated by an OS other than the Android OS.

As illustrated in FIG. 4, the software configuration of the drone-side information processing device 200 includes an application layer, an application framework layer, a standard library layer, and a kernel layer.

The application framework layer, the standard library layer, and the kernel layer are layers that cannot be rewritten by an end user. Meanwhile, the application layer is a layer in which the end user can perform rewriting such as addition or deletion of an application by download (DL).

As illustrated in FIG. 4, the application framework layer includes a drone-side service application (an example of a first application). The drone-side service application is, for example, an application program installed in advance at the time of shipment of the drone-side information processing device 200. The drone-side service application is, for example, an application program that cannot be rewritten by a user (an example of an end user) who operates the drone 100.

The application layer includes a drone-side control application (an example of a second application). The drone-side control application is an application program downloaded from an external server (not illustrated) or the like and added by the user who operates the drone 100. The drone-side service application is an application program that can be deleted and rewritten by the user who operates the drone 100.

The drone-side control application according to the embodiment of the present disclosure does not directly communicate with the external device 300 and the server device 40. The drone-side control application communicates with each of the external device 300 and the server device 40 via the drone-side service application.

In this manner, the drone-side control application communicates with each of the external device 300 and the server device 40 via the drone-side service application in advance. As a result, in the moving body system 1 according to the embodiment of the present disclosure, the information processing device connected to the external device 300 and the server device 40 can be limited to the specific drone-side information processing device 200 in which the drone-side service application is installed in advance.

(Drone-Side Service Application)

The drone-side service application illustrated in FIG. 4 relays exchange between the drone-side control application and the external device 300 and exchange between the drone-side control application and the server device 40. The drone-side service application includes a network module (Network in FIG. 4), a command processing module (Command Processor in FIG. 4), and a universal serial bus (USB) host module (USB host in FIG. 4).

The network module is a communication module that communicates with the server device 40 via the base station 60. The network module performs communication with the server device 40 using a predetermined encryption method such as an SSL.

The command processing module is a module that converts a control instruction for the drone 100 by the drone-side control application into a control command to be transmitted to the external device 300. The command processing module converts control instruction information by the drone-side control application into control command information that can be processed by the external device 300.

The USB host module is a communication module that communicates with the external device 300. It is noted that, in the present embodiment, the drone-side information processing device 200 and the external device 300 perform communication by USB, but the present disclosure is not limited thereto. The drone-side information processing device 200 and the external device 300 may be connected to each other by, for example, Bluetooth, near field communication (NFC), or the like.

It is noted that the module included in the drone-side service application is an example, and the present disclosure is not limited thereto. The drone-side service application may include a module other than the module illustrated in FIG. 4.

(Drone-Side Control Application)

The drone-side control application controls the drone 100 based on, for example, an instruction from the server device 40. The drone-side control application receives instruction information from the server device 40 via the drone-side service application. The drone-side control application transmits control information for controlling the drone 100 to the external device 300 via the drone-side service application.

The drone-side control application illustrated in FIG. 4 includes, for example, an attitude heading reference system (AHRS) module (AHRS in FIG. 4), a camera module (Camera in FIG. 4), a sensor module (Sensor in FIG. 4), and a monitor module (Monitor in FIG. 4). The drone-side control application includes, for example, a battery module (Battery in FIG. 4), a location module (Location in FIG. 4), and an artificial intelligence (AI) module (AI in FIG. 4). The drone-side control application includes, for example, a Bluetooth module (BT in FIG. 4) and a video streaming module (Video Streaming in FIG. 4).

The AHRS module is, for example, an attitude measuring module that detects a location and an attitude of the drone 100 based on a measurement result of the AHRS (an attitude heading reference system) mounted on the drone-side information processing device 200. Alternatively, the AHRS module may detect the location and the attitude of the drone 100 based on, for example, the measurement result of the AHRS mounted on the drone 100.

The camera module is, for example, a photographing module that controls a camera mounted on the drone-side information processing device 200 and photographs a video of periphery of the drone 100. Alternatively, for example, the camera module may control a camera mounted on the drone 100 to capture the video of the periphery of the drone 100.

The sensor module is, for example, a module that controls a sensor mounted on the drone-side information processing device 200 and senses a state of the periphery of the drone 100. Alternatively, for example, the camera module may control a sensor mounted on the drone and senses a state of the periphery of the drone 100. The sensor module can control various sensors such as a distance measuring sensor, an ambient light sensor, and a microphone.

The monitor module is, for example, a module that controls a monitor mounted on the drone-side information processing device 200 and causes the monitor to display various types of information. The monitor module can display, for example, the video captured by the camera module on the monitor. The monitor module may display, for example, a flight route of the drone 100 on the monitor. The monitor module can display, for example, information indicating flight permission of the drone 100 on the monitor. In this manner, the monitor module can display various types of information on the monitor.

The battery module is, for example, a management module that manages the battery of the drone 100. For example, the battery module acquires a state (for example, a remaining battery amount) of the battery of the drone 100 via the external device 300. The battery module transmits, for example, the acquired state of the battery to the server device 40.

The location module is, for example, a module that manages location information of the drone 100 based on a positioning result by a positioning system such as a global positioning system (GPS) or the like mounted on the drone-side information processing device 200. Alternatively, the location module may detect, for example, the position of the drone 100 based on the positioning result of the positioning system mounted on the drone 100. For example, the location module transmits the acquired location information to the server device 40.

The AI module is a module that generates control information of the drone 100 based on information detected by each module (for example, the attitude information and the location information of the drone 100) and the instruction from the server device 40.

The AI module autonomously controls the location and the attitude of the drone 100 using, for example, a learned model (AI) learned in advance using a detection result by each module and the instruction information from the server device 40 as learning data.

For example, the AI module inputs information on the current location and the attitude of the drone 100 and the instruction information from the server device 40 to the learned model, and obtains control information for controlling the drone 100 as an output. The AI module controls the drone 100 by transmitting the obtained control information to the drone 100 via the external device 300.

It is noted that, here, the drone-side information processing device 200 controls the drone 100 using AI, but the present disclosure is not limited thereto. The drone-side information processing device 200 is only required to control the drone 100 based on the information on the current location and the attitude of the drone 100 and the instruction information from the server device 40. The drone-side information processing device 200 can control the drone 100 using any control method. In this case, the drone-side control application may include, for example, a drone control module instead of the AI module.

The Bluetooth module is a communication module that performs communication with an external device (for example, the base station 60) by Bluetooth. Furthermore, the Bluetooth module has a function of transmitting, for example, a signal (hereinafter, also referred to as an identification signal) for specifying identification information for identifying the drone 100 to the external device (for example, the base station 60). The identification information is, for example, a vehicle ID of the drone 100. The Bluetooth module transmits, for example, a beacon signal (for example, iBeacon (registered trademark)) as the identification signal.

It is noted that the drone-side information processing device 200 may perform communication using a radio communication standard or a radio communication method, such as Wi-Fi (registered trademark), ultra wide band (UWB), or low power wide area (LPWA), in addition to Bluetooth. Alternatively, the drone-side information processing device 200 may perform cellular communication such as LTE or NR.

For example, the drone-side information processing device 200 communicates with the base station 60 by the radio communication method selected according to the instruction from the server device 40 based on the radio communication method permitted according to the flight of the drone 100.

The video streaming module is a module that performs streaming transmission of the video acquired by the camera module to the server device 40. The video streaming module transmits the video acquired by the camera module to the server device 40 via the base station 60.

It is noted that the module included in the drone-side control application is an example, and the present disclosure is not limited thereto. The drone-side control application may include a module other than the module illustrated in FIG. 4.

<2.2. Configuration Example of External Device>

Figure 5:
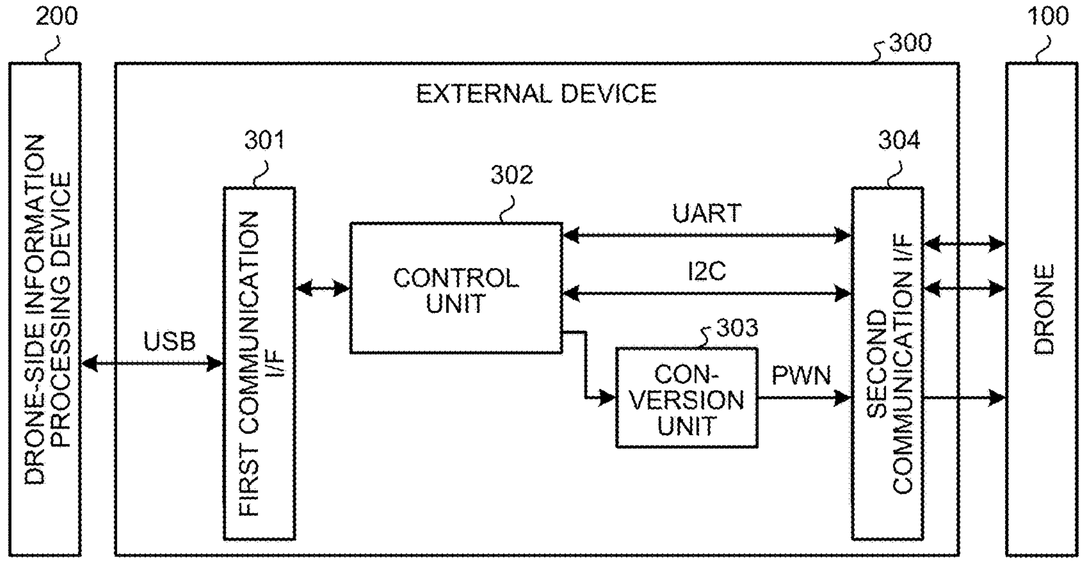
FIG. 5 is a block diagram illustrating a functional configuration example of an external device according to the embodiment of the present disclosure.

FIG. 5 is a block diagram illustrating a functional configuration example of the external device 300 according to the embodiment of the present disclosure. The external device 300 includes a first communication I/F 301, a control unit 302, a conversion unit 303, and a second communication I/F 304. It is noted that the configuration illustrated in FIG. 5 is a functional configuration, and a hardware configuration may be different from the functional configuration. Furthermore, the functions of the external device 300 may be implemented in a distributed manner in a plurality of physically separated configurations.

The first communication I/F 301 is a communication interface for communicating with the drone-side information processing device 200. The first communication I/F 301 is a USB interface including, for example, a USB host controller, a USB port, and the like. It is noted that communication performed by the first communication I/F 301 is not limited to communication by USB. The first communication I/F 301 may perform communication by, for example, Bluetooth or NFC.

The control unit 302 is a controller that controls each unit of the external device 300. The control unit 302 may be a processor such as a central processing unit (CPU) or a graphics processing unit (GPU), a microcomputer, or a control board on which a processor and a storage element such as a memory are mounted in a mixed manner. Various functions can be implemented by allowing the processor of the control unit 302 to be operated according to a predetermined program.

The control unit 302 controls the drone 100 based on the control information acquired from the drone-side information processing device 200 via the first communication I/F 301. The control unit 302 generates a control signal for controlling the drone 100 based on the control information.

Furthermore, the control unit 302 controls, for example, a sensor (for example, the camera, the positioning sensor, the AHRS, or the like) mounted on the drone 100 in accordance with an instruction from the drone-side information processing device 200. Furthermore, the control unit 302 notifies, for example, the drone-side information processing device 200 of a sensing result by the sensor mounted on the drone 100. The control unit 302 acquires information on the state of the drone 100, such as the state of the battery of the drone 100, from the drone 100, and notifies the drone-side information processing device 200 of the acquired information.

The conversion unit 303 converts the control signal generated by the control unit 302 into a control signal modulated by pulse width modulation (PWM) (hereinafter, also referred to as a PWM control signal). The conversion unit 303 may be realized by, for example, an integrated circuit (IC), a large scale integration (LSI), or the like, or may be realized by one circuit block on a semiconductor chip (die). Furthermore, the control unit 302 may have the function of the conversion unit 303. In this case, the conversion unit 303 can be omitted.

The second communication I/F 304 is a communication interface for performing communication with the drone 100. The second communication I/F 304 can be, for example, a communication interface that performs communication according to the universal asynchronous receiver transmitter (UART) standard. The second communication I/F 304 can be a communication interface that performs serial communication such as inter-integrated circuit (I2C). The second communication I/F 304 can be a communication interface that transmits the PWM control signal to the drone 100.

Figure 6:
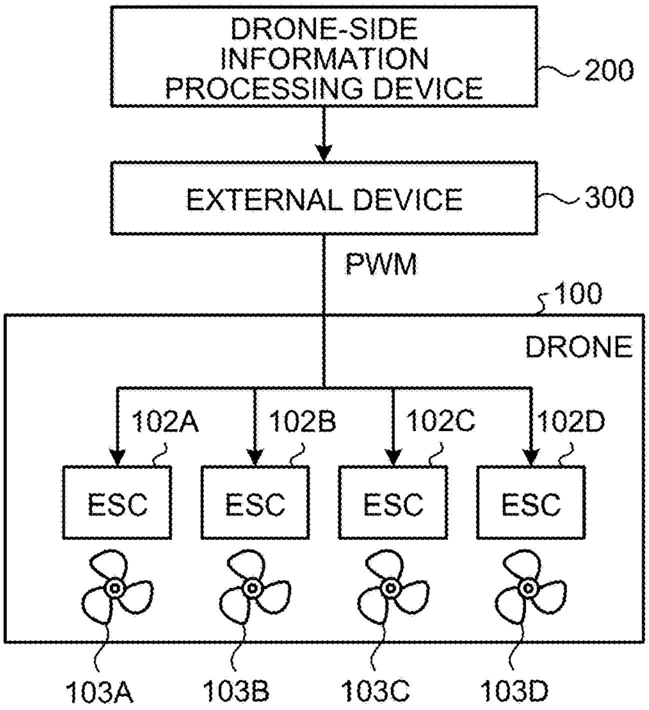
FIG. 6 is a diagram illustrating an example of control of a drone by the external device according to the embodiment of the present disclosure.

FIG. 6 is a diagram illustrating an example of control of the drone 100 by the external device 300 according to the embodiment of the present disclosure.

As illustrated in FIG. 6, the drone 100 includes, for example, four propellers 103A to 103D (an example of a drive unit) and ESCs 102A to 102D (an example of a drive control unit), each of which drives a corresponding one of the propellers 103A to 103D. The drone 100 includes a frame, a motor, a battery, and the like (all not illustrated) in addition to the ESC 102 and the propeller 103 illustrated in FIG. 6.

The drone-side information processing device 200 performs attitude control of the drone 100 based on the current location and the attitude of the drone 100 and the instruction from the server device 40, and generates control information. The drone-side information processing device 200 outputs the control information to the external device 300.

The external device 300 generates a control signal for controlling the drone 100 based on the control information acquired from the drone-side information processing device 200. In the example of FIG. 6, the external device 300 modulates the generated control signal by PWM to generate a PWM control signal. The PWM control signal is a signal for directly controlling the ESCs 102A to 102D provided in the drone 100. The external device 300 outputs the PWM control signal to the ESCs 102A to 102D of the drone 100.

The ESCs 102A to 102D control motors (not illustrated) based on the PWM control signal acquired from the external device 300 to control the propellers 103A to 103D.

As described above, the external device 300 generates the PWM control signal according to the attitude control of the drone 100 by the drone-side information processing device 200, thereby enabling the control device 20 to directly control the ESCs 102A to 102D. Thus, the drone-side information processing device 200 can control the drone 100 via the external device 300.

Figure 7:
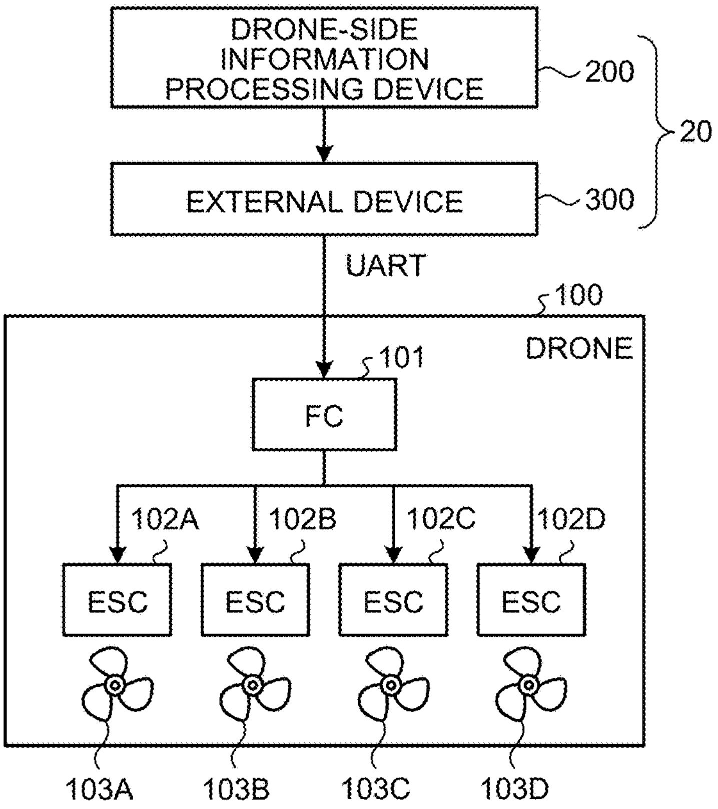
FIG. 7 is a diagram illustrating another example of the control of the drone by the external device according to the embodiment of the present disclosure.

FIG. 7 is a diagram illustrating another example of the control of the drone 100 by the external device 300 according to the embodiment of the present disclosure.

In addition to the ESCs 102A to 102D and the propellers 103A to 103D, the drone 100 illustrated in FIG. 7 includes a flight controller (FC) 101 (an example of a movement control unit) that controls the ESCs 102A to 102D. The control illustrated in FIG. 7 is different from the control illustrated in FIG. 6 in that the FC 101 controls the attitude of the drone 100 instead of the drone-side information processing device 200.

The drone-side information processing device 200 illustrated in FIG. 7 generates control information on the flight of the drone (100), such as the moving direction and the flight speed of the drone 100 and taking-off/landing, in response to an instruction from the server device 40. The drone-side information processing device 200 outputs the generated control information to the external device 300.

The external device 300 generates a control signal for controlling the drone 100 based on the control information acquired from the drone-side information processing device 200. This control signal includes instruction information for the operation of the FC 101 of the drone 100 and is transmitted according to, for example, the UART standard.

The FC 101 of the drone 100 receives the control signal from the external device 300. The FC 101 controls the ESCs 102A to 102D based on the control signal. Each of the ESCs 102A to 102D controls a corresponding one of the propellers 103A to 103D by controlling a motor (not illustrated) according to an instruction from the FC 101.

In this manner, the control device 20 controls the FC 101 mounted on the drone 100 so as to control the drone 100. As a result, the control device 20 can control the drone 100 without directly controlling the ESCs 102 to 102D. Thus, the drone-side information processing device 200 can control the drone 100 via the external device 300.

<2.3. Configuration Example of User-Side Information Processing Device>

The moving body system 1 according to the embodiment of the present disclosure includes the user-side information processing device 50 that receives an operation from a user for flight of the drone 100. The user-side information processing device 50 is, for example, a portable information processing device such as a smartphone.

As described above, the user-side information processing device 50 receives an operation on the drone 100 from the user, and transmits operation information on the received operation to the drone-side information processing device 200 via the server device 40. As described above, in the moving body system 1 according to the embodiment of the present disclosure, the remote operation of the drone 100 by the user-side information processing device 50 is executed via the server device 40.

Since the hardware configuration of the user-side information processing device 50 is the same as that of the drone-side information processing device 200, a description thereof will be omitted.

Figure 8:
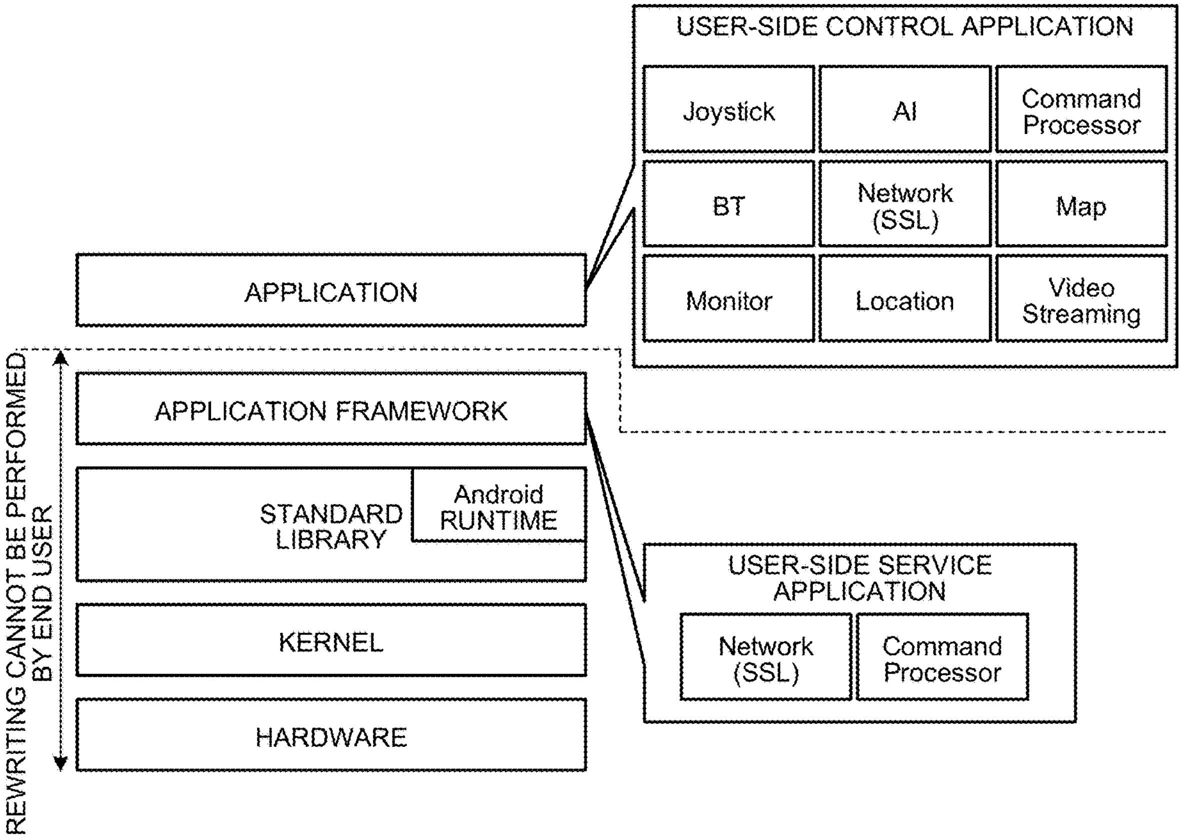
FIG. 8 is a diagram illustrating an example of a software configuration of a user-side information processing device according to the embodiment of the present disclosure.

FIG. 8 is a diagram illustrating an example of a software configuration of the user-side information processing device 50 according to the embodiment of the present disclosure. FIG. 8 illustrates a software configuration of an Android (registered trademark) OS as an example, but the present disclosure is not limited thereto. The user-side information processing device 50 may be operated by an OS other than the Android OS.

As illustrated in FIG. 8, the software configuration of the user-side information processing device 50 includes an application layer, an application framework layer, a standard library layer, and a kernel layer.

As described above, the application framework layer, the standard library layer, and the kernel layer are layers that cannot be rewritten by the end user. Meanwhile, the application layer is a layer in which the end user can perform rewriting such as addition or deletion of an application by download (DL).

As illustrated in FIG. 8, the application framework layer includes a user-side service application (an example of a third application). The user-side service application is, for example, an application program installed in advance at the time of shipment of the user-side information processing device 50. The user-side service application is, for example, an application program that cannot be rewritten by the user (an example of the end user) who operates the drone 100.

The application layer includes a user-side control application (an example of a fourth application). For example, the user-side control application is an application program downloaded from an external server (not illustrated) or the like and added by the user who operates the drone 100. The user-side service application is an application program that can be deleted and rewritten by the user who operates the drone 100.

The user-side control application according to the embodiment of the present disclosure does not directly communicate with the server device 40. The user-side control application communicates with the server device 40 via the user-side service application.

In this manner, the user-side control application communicates with the server device 40 via the user-side service application in advance. As a result, in the moving body system 1 according to the embodiment of the present disclosure, the information processing device connected to the server device 40 can be limited to the specific user-side information processing device 50 in which the user-side service application is installed in advance.

(User-Side Service Application)

The user-side service application illustrated in FIG. 8 relays exchange between the user-side control application and the server device 40. The user-side service application includes a network module (Network in FIG. 8) and a command processing module (Command Processor in FIG. 8).

The network module is a communication module that communicates with the server device 40 via the network N (refer to FIG. 1). The network module performs communication with the server device 40 using a predetermined encryption method such as an SSL.

The command processing module is a module that converts an operation on the drone 100 by the user-side control application into an operation command to be transmitted to the server device 40. The command processing module converts operation information by the user-side control application into operation command information that can be processed by the drone-side information processing device 200 that received the operation information via the server device 40.

It is noted that the module included in the user-side service application is an example, and the present disclosure is not limited thereto. The user-side service application may include a module other than the module illustrated in FIG. 8.

(User-Side Control Application)

The user-side control application operates (controls) the drone 100 based on, for example, an instruction from the user. The user-side control application receives the instruction from the user. The user-side control application transmits instruction information to the server device 40 via the user-side service application.

The user-side control application illustrated in FIG. 8 includes, for example, an operation reception module (Joystick in FIG. 8), an AI module (AI in FIG. 8), a command processing module (Command Processor in FIG. 8), and a Bluetooth module (BT in FIG. 8). The user-side control application includes, for example, a network module (Network in FIG. 8), a map module (Map in FIG. 8), and a monitor module (Monitor in FIG. 8). The user-side control application includes, for example, a location module (Location in FIG. 8) and a video streaming module (Video Streaming in FIG. 8).

An operation reception module receives, for example, an operation on the drone 100 from the user via a joystick. A device with which the operation reception module receives the operation from the user is not limited to the joystick, and may be, for example, an operation device such as a remote controller. Furthermore, the operation device may be, for example, a real device connected to the user-side information processing device 50, or may be a virtual device displayed on a monitor (not illustrated) of the user-side information processing device 50.

The AI module is a module that generates operation information on the drone 100 based on information detected by each module and information on the drone 100 acquired from the drone-side information processing device 200.

The AI module generates the operation information of the drone 100 using, for example, a learned model (AI) in which a detection result by each module and the information on the drone 100 are learned in advance as learning data.

For example, the AI module inputs information on the current location and the attitude of the drone 100 and the operation from the user to the learned model, and obtains operation information for operation of the drone 100 as an output. The AI module transmits the obtained operation information to the drone-side information processing device 200 via the server device 40.

It is noted that, here, the user-side information processing device 50 generates the operation information using AI, but the present disclosure is not limited thereto. The user-side information processing device 50 may generate the operation information based on the information on the current location and the attitude of the drone 100 or the operation from the user. The user-side information processing device 50 can generate the operation information by any method. In this case, the user-side control application can include, for example, an operation information generation module instead of the AI module.

The command processing module is a module that converts an operation received from the user into an operation command to be transmitted to a device (not illustrated) other than the server device 40. The network module is a communication module that communicates with a device other than the server device 40 via the network N. The network module communicates with other devices using a predetermined encryption method such as an SSL. As described above, in a case where the user-side control application performs communication with a device other than the server device 40, the user-side control application can directly perform communication without passing through the user-side service application.

The Bluetooth module is a communication module that performs communication with an external device (for example, a device that relays a connection to the network N) by Bluetooth. It is noted that the user-side information processing device 50 may perform communication using a radio communication standard or a radio communication method such as Wi-Fi (registered trademark), ultra wide band (UWB), or low power wide area (LPWA) in addition to Bluetooth. Alternatively, the user-side information processing device 50 may perform cellular communication such as LTE or NR.

The map module is, for example, a module that acquires and manages map information used for setting a flight path of the drone 100. The map module acquires the map information including a place at which the drone 100 is located based on, for example, location information of the drone 100.

The location module is, for example, a module that manages the location information of the drone 100 based on a positioning result by a positioning system such as a global positioning system (GPS) or the like mounted on the drone-side information processing device 200 and/or the drone 100. For example, the location module manages the location information of the drone 100 based on the location information acquired from the drone-side information processing device 200 via the server device 40.

The video streaming module is a module that acquires a streaming video transmitted from the drone-side information processing device 200.

The monitor module is, for example, a module that controls a monitor mounted on the drone-side information processing device 200 and causes the monitor to display various types of information. The monitor module causes, for example, the monitor to display a display image including various types of information.

Figure 9:
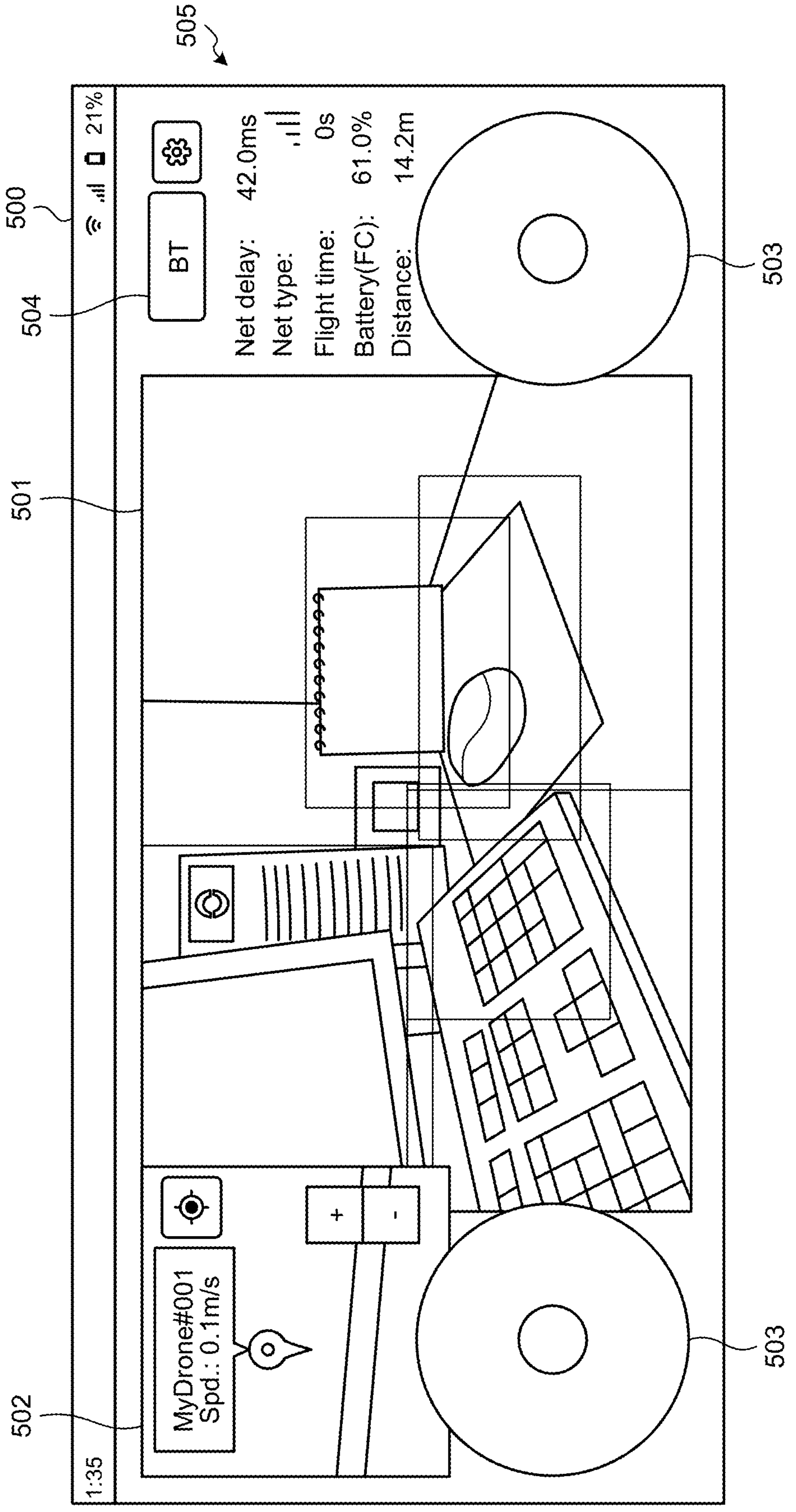
FIG. 9 is a diagram illustrating an example of a display image displayed on a monitor of the user-side information processing device according to the embodiment of the present disclosure.

FIG. 9 is a diagram illustrating an example of a display image 500 displayed on the monitor of the user-side information processing device 50 according to the embodiment of the present disclosure. As described above, the display image 500 is displayed on the monitor by the monitor module.

In the example illustrated in FIG. 9, the monitor module displays a video of the periphery of the drone 100 in a central area 501 of the display image 500. The video of the periphery the drone 100 is, for example, a video captured by a camera mounted on the drone-side information processing device 200, and is a video streamed and transmitted from the drone-side information processing device 200. The video is acquired by the video streaming module of the user-side control application. The monitor module displays the video acquired by the video streaming module in the area 501.

The monitor module displays map information, for example, in an upper left area 502 of the display image 500. The map information is, for example, information acquired by the map module. The monitor module displays, for example, the location information of the drone 100 managed by the location module in a superimposed manner on the map information.

In the example of FIG. 9, the monitor module displays virtual operation devices (for example, joysticks) 503 respectively disposed at the lower left side and the lower right side of the display image 500. The user operates the operation devices 503 to operate the location, the attitude, and the like of the drone 100.

For example, an upper right button 504 of the display image 500 is a button that receives, from the user, switching of whether or not the Bluetooth module (refer to FIG. 4) of the drone-side information processing device 200 transmits an identification signal (for example, a beacon signal) for identifying the drone 100. When the user presses the button 504, the user-side information processing device 50 requests the drone-side information processing device 200 to transmit or stop transmitting the identification signal. The user-side information processing device 50 switches the transmission of the identification signal and the stop of the transmission thereof in response to the request.

In addition, for example, the monitor module displays flight information on the flight of the drone 100 in an area 505 below the button 504 of the display image 500. In the example of FIG. 9, the monitor module displays information on a network delay (Net delay in FIG. 9) and information on a communication method and signal strength used when the drone-side information processing device 200 communicates with the base station 60 (Net type in FIG. 9) in the area 505. In the example of FIG. 9, the monitor module displays an antenna mark to display information indicating that the drone-side information processing device 200 is performing communication with the base station 60 via a mobile phone communication network (cellular).

In addition, the monitor module displays information on a flight time of the drone 100 (Flight time in FIG. 9) and information on a battery mounted on the drone 100 (Battery (FC) in FIG. 9) in the area 505. The monitor module displays a distance (Distance in FIG. 9) between the user-side information processing device 50 and the drone 100 in the area 505. The distance between the user-side information processing device 50 and the drone 100 can be used, for example, to determine whether the drone 100 performs the in-visual flight or the non-visual flight.

Furthermore, for example, when the AI module of the user-side control application detects an object such as an obstacle from a video obtained by capturing the periphery of the drone 100, the monitor module may display the video on the monitor by emphasizing the obstacle detected by the AI module. In the example of FIG. 9, the monitor module displays a video by surrounding the object detected by the AI module with a square frame.

Here, the user-side control application performs the object detection, but the present disclosure is not limited thereto. The object detection may be performed by the server device 40, or may be performed by the drone-side information processing device 200.

In addition, the display image 500 illustrated in FIG. 9 is an example, and various types of information included in the display image 500 are not limited to the example of FIG. 9. For example, information other than the information illustrated in FIG. 9, such as a flight path of the drone 100 being displayed on the display image 500, may be included in the display image 500.

Furthermore, the module included in the drone-side control application illustrated in FIG. 8 is an example, and the present disclosure is not limited thereto. The drone-side control application may include a module other than the module illustrated in FIG. 8.

<2.4. Configuration Example of Server Device>

The server device 40 according to the embodiment of the present disclosure is an information processing device that performs remote operation of the drone 100. The server device 40 includes, for example, an information processing device such as a personal computer, a workstation, or a cloud server.

The server device 40 manages, for example, a user who operates the drone 100 and manages vehicle information of the drone 100. As management of the drone 100, the server device 40 manages permission information (for example, area information indicating an area in which the drone 100 can fly, and the like) on flight of the drone 100 by a network operator, a country, a local government, or the like.

The server device 40 transmits, for example, a video of the periphery of the drone 100 captured by the drone-side information processing device 200 to the user-side information processing device 50. The server device 40 transmits the operation information of the drone 100 acquired from the user-side information processing device 50 to the drone-side information processing device 200.

The server device 40 receives a connection from the user-side service application installed in the user-side information processing device 50, and does not receive a connection from another application installed in the user-side information processing device 50. The server device 40 receives a connection from the drone-side service application installed in the drone-side information processing device 200, and does not receive a connection from another application installed in the drone-side information processing device 200.

As described above, the server device 40 limits the application that receives the access, so that the security of the moving body system 1 can be maintained at a higher level.

A communication path between the server device 40 and the user-side information processing device 50 and a communication path between the server device 40 and the drone-side information processing device 200 are encrypted by an existing method such as SSL or datagram transport layer security (DTLS).

(Functional Configuration Example of Server Device 40)

Figure 10:
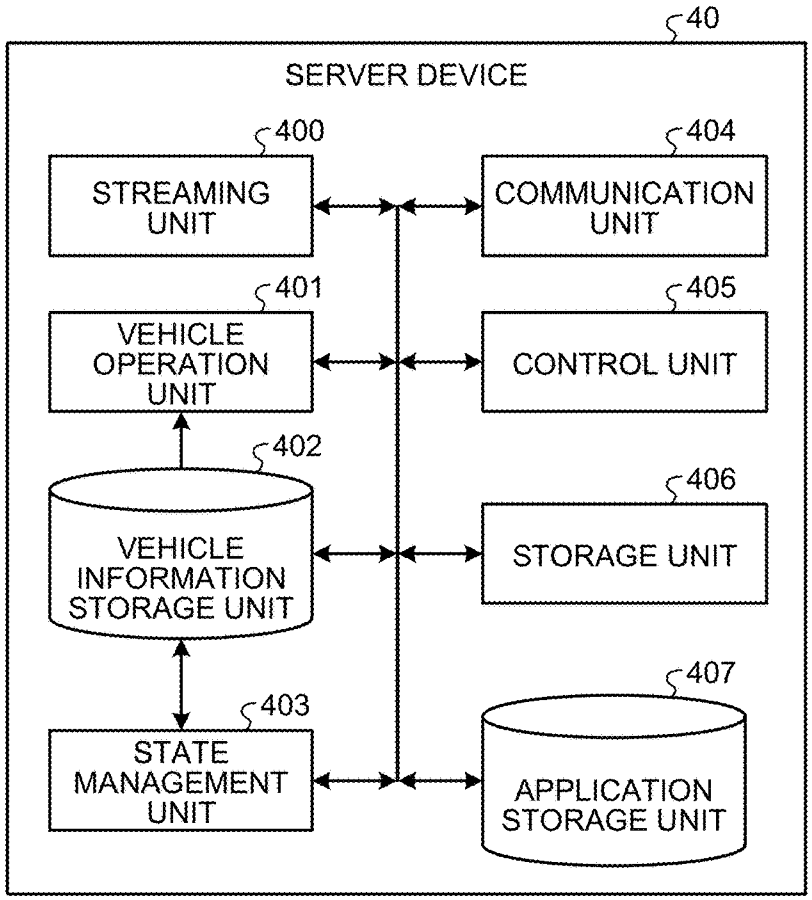
FIG. 10 is a functional block diagram illustrating an example of a function of a server device according to the embodiment of the present disclosure.

FIG. 10 is a functional block diagram illustrating an example of a function of the server device 40 according to the embodiment of the present disclosure. The server device 40 illustrated in FIG. 10 includes a streaming unit 400, a vehicle operation unit 401, a vehicle information storage unit 402, a state management unit 403, a communication unit 404, a control unit 405, a storage unit 406, and an application storage unit 407.

The control unit 405 controls the entire operation of the server device 40. The communication unit 404 communicates with the network N under the control of the control unit 405. The storage unit 406 controls reading and writing of data from and to a memory (not illustrated).

The streaming unit 400 performs streaming transmission of a streaming video received from the drone-side information processing device 200 to the user-side information processing device 50. The streaming unit 400 can stream a video using an existing streaming technology. The streaming unit 400 performs streaming transmission of the video encrypted using, for example, DTLS.

It is noted that, for example, the server device 40 can implement streaming transmission using an existing service such as Amazon Cognito (registered trademark) or Amazon Kinesis (registered trademark) provided by Amazon.

The vehicle information storage unit 402 is a database that stores information on the drone 100. The vehicle information storage unit 402 stores information on the state of the drone 100, such as the current location and the attitude of the drone 100. The vehicle information storage unit 402 stores information on a flight path of the drone 100 and a battery thereof. For example, the vehicle information storage unit 402 stores permission information on the flight of the drone 100, such as a flyable area of the drone 100.

The vehicle information storage unit 402 stores, for example, a drone ID for identifying the drone 100 and a user ID for identifying a user who steers the drone 100 in association with each other. The user ID may be, for example, an ID for identifying the drone-side information processing device 200 or an ID for identifying the user-side information processing device 50. The ID for identifying the drone-side information processing device 200 and the ID for identifying the user-side information processing device 50 may be the same ID.

The vehicle operation unit 401 operates the drone 100 based on, for example, an operation from the user. The vehicle operation unit 401 operates the drone 100 based on, for example, the location, the attitude, and the flight path of the drone 100. The vehicle operation unit 401 sets, for example, the flight path of the drone 100.

The vehicle operation unit 401 transmits operation information on the drone 100, path information on the flight path, and the like to the drone-side information processing device 200. The vehicle operation unit 401 transmits the pieces of information encrypted using, for example, SSL to the drone-side information processing device 200.

The state management unit 403 manages, for example, information acquired from the drone 100. The state management unit 403 stores, for example, information of the drone 100, such as a location and an attitude of the drone 100 and a remaining battery amount, in the vehicle information storage unit 402. The state management unit 403 transmits the information of the drone 100 to the user-side information processing device 50. The vehicle operation unit 401 transmits the information encrypted using, for example, SSL to the user-side information processing device 50.

Furthermore, the state management unit 403 may manage a login state of the user by performing authentication processing such as user authentication using the user ID or drone authentication using the drone ID. In this case, the state management unit 403 can perform the authentication processing using, for example, a browser as an interface.

The state management unit 403 can perform the authentication processing using, for example, SSL.

The application storage unit 407 is a database that stores applications operating in the server device 40. A video streaming function in the streaming unit 400, a vehicle operation function by the vehicle operation unit 401, a state management function by the state management unit 403, and the like described above are implemented by allowing the server device 40 to execute the applications stored in the application storage unit 407. The server device 40 downloads and installs, for example, applications for implementing these functions via the network N. The installed applications are stored in the application storage unit 407.

Here, it is assumed that each of the streaming unit 400, the vehicle operation unit 401, and the state management unit 403 implements each of the functions by allowing the server device 40 to execute the applications stored in the application storage unit 407, but the present disclosure is not limited thereto. For example, the control unit 405 may implement the video streaming function, the vehicle operation function, and the state management function. That is, the streaming unit 400, the vehicle operation unit 401, and the state management unit 403 can be implemented as a part of the functions of the control unit 405. In this case, for example, when an application is executed by the server device 40, the control unit 405 functions as the streaming unit 400, the vehicle operation unit 401, and the state management unit 403.

Here, the storage unit 406, the vehicle information storage unit 402, and the application storage unit 407 are different from each other, but the present disclosure is not limited thereto. For example, the storage unit 406 may include the vehicle information storage unit 402 and the application storage unit 407.

(Hardware Configuration Example of Server Device 40)

Figure 11:
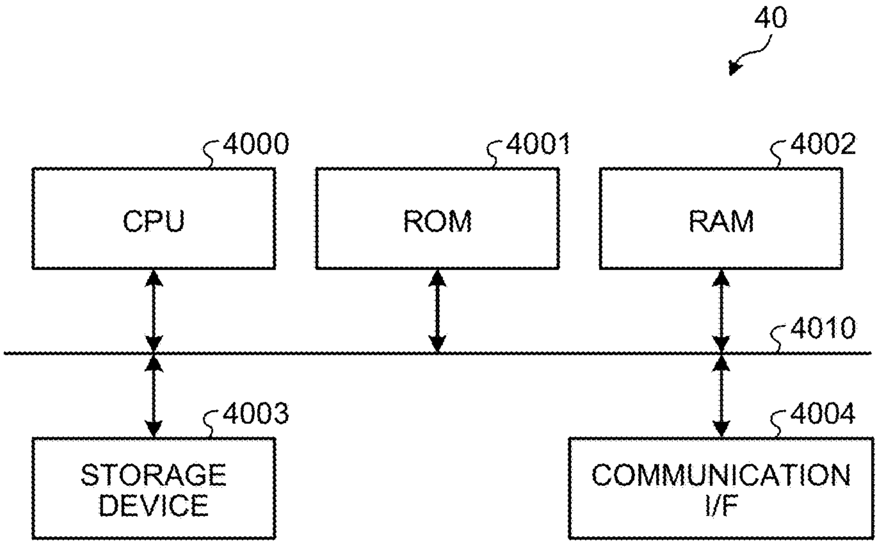
FIG. 11 is a block diagram illustrating an example of a hardware configuration of the server device according to the embodiment of the present disclosure.

FIG. 11 is a block diagram illustrating an example of a hardware configuration of the server device 40 according to the embodiment of the present disclosure. In FIG. 11, the server device 40 includes a CPU 4000, a ROM 4001, a RAM 4002, a storage device 4003, and a communication I/F 4004. The CPU 4000, the ROM 4001, the RAM 4002, the storage device 4003, and the communication I/F 4004 are communicably connected to each other via a bus 4010.

The storage device 4003 is a non-volatile storage medium such as a hard disk drive or a flash memory. The storage device 4003 stores various programs and data for the operation of the CPU 4000.

The CPU 4000 operates according to an information processing program stored in advance in the ROM 4001 and the storage device 4003, and controls the overall operation of the server device 40. The communication I/F 4004 executes communication with respect to the network N under the control of the CPU 4000.

The control unit 405 described above is implemented by operating, on the CPU 4000, a basic program (for example, an operating system (OS)) of the server device 40 stored in advance in the storage device 4003. The communication unit 404 is implemented as, for example, the communication I/F 4004. The storage unit 406, the vehicle information storage unit 402, and the application storage unit 407 are implemented as, for example, the storage device 4003.

In addition, the streaming unit 400, the vehicle operation unit 401, and the state management unit 403 are implemented, for example, by executing an application (an application program) on the CPU 4000. For example, when the CPU 4000 reads the application from the storage medium such as the storage device 4003 and executes the application, the above-described respective units are loaded on the main storage device such as the RAM 4002, and the respective units are generated on the main storage device.

Alternatively, some or all of the streaming unit 400, the vehicle operation unit 401, and the state management unit 403 may be configured using hardware circuits that operate in cooperation with each other.

3. Communication Processing

As described above, the user-side information processing device 50 remotely operates the drone 100 based on the operation by the user. Furthermore, the user-side information processing device 50 acquires the information on the drone 100. As described above, in the moving body system 1, the communication processing for performing the remote operation of the drone 100 is executed.

Figure 12:
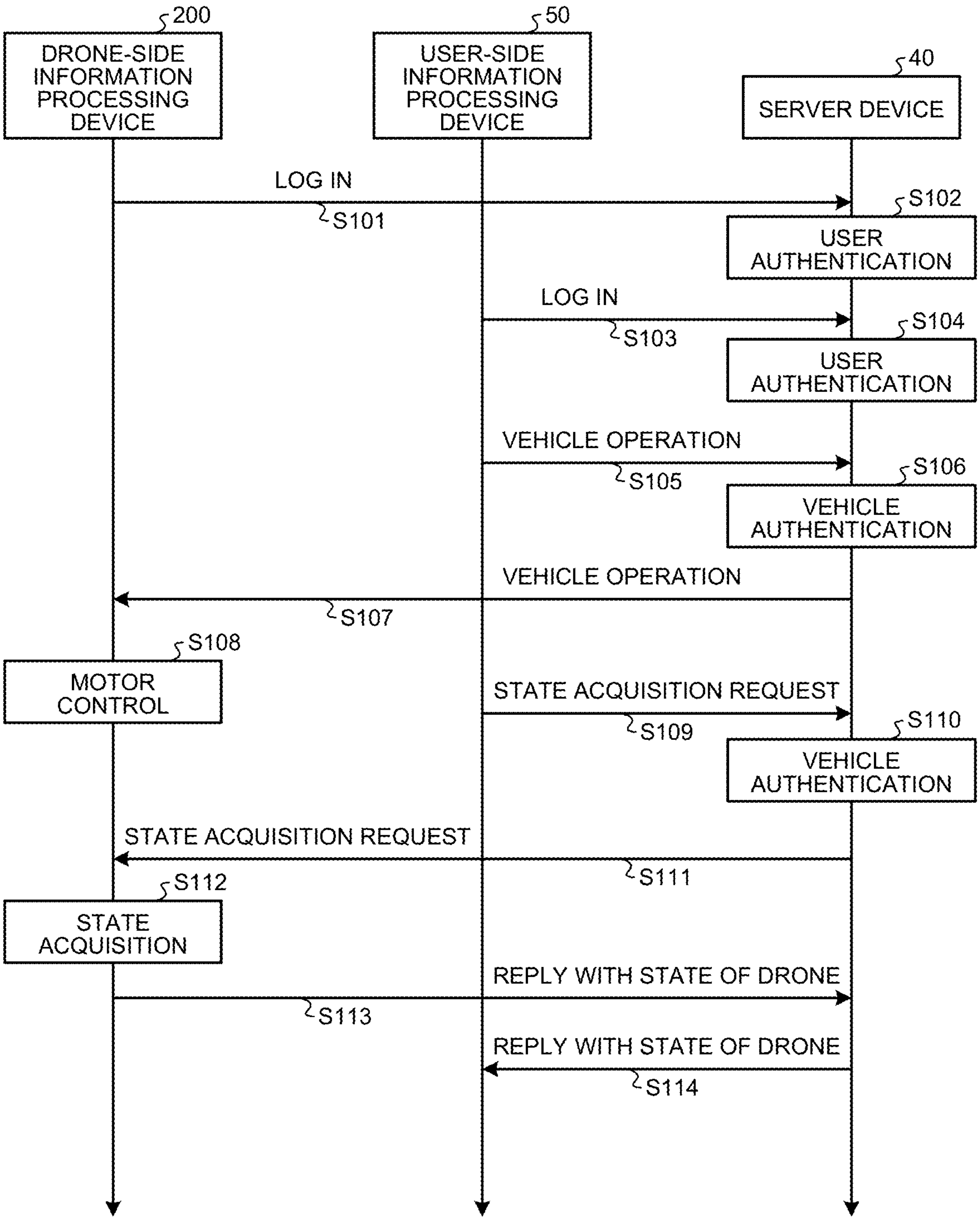
FIG. 12 is a sequence diagram illustrating an example of a flow of communication processing executed in the moving body system according to the embodiment of the present disclosure.

FIG. 12 is a sequence diagram illustrating an example of a flow of communication processing executed in the moving body system 1 according to the embodiment of the present disclosure.

As illustrated in FIG. 12, the drone-side information processing device 200 logs in to the server device 40 (Step S101). For example, when the drone-side control application is connected to the server device 40 via the drone-side service application, the drone-side information processing device 200 performs login processing on the server device 40.

The server device 40 performs user authentication on the drone-side information processing device 200 (Step S102). For example, the server device 40 performs the user authentication according to whether the user ID acquired from the drone-side information processing device 200 is stored in the vehicle information storage unit 402.

The user-side information processing device 50 logs in to the server device 40 (Step S103). For example, when the user-side control application is connected to the server device 40 via the user-side service application, the user-side information processing device 50 performs login processing on the server device 40.

The server device 40 performs user authentication on the user-side information processing device 50 (Step S104). For example, the server device 40 performs the user authentication according to whether the user ID acquired from the user-side information processing device 50 is stored in the vehicle information storage unit 402.

Next, the user-side information processing device 50 that has received an operation (a vehicle operation) on the drone 100 from a user transmits information on the vehicle operation to the server device 40 (Step S105). For example, the user-side control application transmits the information on the vehicle operation to the server device 40 via the user-side service application.

The server device 40 performs vehicle authentication based on the information on the vehicle operation transmitted from the user-side information processing device 50 (Step S106). For example, the server device 40 performs the vehicle authentication according to whether the drone ID included in the information on the vehicle operation is stored in the vehicle information storage unit 402. The server device 40 may perform the vehicle authentication according to whether the user ID of the user-side information processing device 50 that has transmitted the information on the vehicle operation is associated with the drone ID included in the information on the vehicle operation.

In this manner, the server device 40 performs the vehicle authentication of the drone 100 which is an operation target, whereby the user-side information processing device 50 can be prevented from operating a drone which is not the operation target.

The server device 40 that has performed the vehicle authentication transmits the information on the vehicle operation to the drone-side information processing device 200 (Step S107). The server device 40 transmits the information on the vehicle operation to the user-side control application via, for example, the user-side service application.

The drone-side information processing device 200 performs motor control of the drone 100 based on the received information on the vehicle operation (Step S108). More specifically, the drone-side control application of the drone-side information processing device 200 transmits control information to the external device 300 via the drone-side service application. The external device 300 controls the ESCs 102A to 102D of the drone 100 directly or indirectly via the FC 101 based on the control information. As a result, the motor of the drone 100 is controlled.

Next, when the user-side information processing device 50 acquires the state related to the drone 100, the user-side information processing device 50 transmits an information acquisition request to the server device 40 (Step S109). For example, the user-side control application transmits the information acquisition request to the server device 40 via the user-side service application.

The server device 40 performs the vehicle authentication based on the information acquisition request transmitted from the user-side information processing device 50 (Step S110). For example, the server device 40 performs the vehicle authentication according to whether the drone ID included in the information acquisition request is stored in the vehicle information storage unit 402. The server device 40 may perform the vehicle authentication according to whether the user ID of the user-side information processing device 50 that has transmitted the information acquisition request is associated with the drone ID included in the information acquisition request.

In this manner, by allowing the server device 40 to perform the vehicle authentication of the drone 100 which is the state acquisition target, the user-side information processing device 50 can be prevented from acquiring information on a state from a drone which is not the state acquisition target.

The server device 40 that has performed the vehicle authentication transmits the information acquisition request to the drone-side information processing device 200 (Step S111). The server device 40 transmits the information acquisition request to the drone-side control application via, for example, the drone-side service application.

The drone-side information processing device 200 acquires the state of the drone 100 based on the received information acquisition request (Step S112). The drone-side control application of the drone-side information processing device 200 acquires the state of the drone 100, such as the remaining battery amount, the location and the attitude of the drone 100, and the like, from the external device 300 via the drone-side service application.

The drone-side information processing device 200 returns the acquired state of the drone 100 to the server device 40 (Step S113). The drone-side control application returns the state of the drone 100 to the server device 40 via the drone-side service application.

The server device 40 returns the state of the drone 100 to the user-side information processing device 50 (Step S114). The server device 40 returns the state of the drone 100 to the user-side control application via, for example, the user-side service application.

As described above, in the moving body system 1, after the user authentication by the server device 40, the vehicle operation and the state acquisition of the drone 100 by the user-side information processing device 50 are performed. At this time, the server device 40 performs the vehicle authentication of the drone 100 to be operated or acquired each time the vehicle operation or the state acquisition is performed by the user-side information processing device 50. As a result, it is possible to prevent user impersonation and operation and state acquisition of a drone other than a target drone and, as such, the moving body system 1 can fly the drone 100 more safely.

It is noted that, in the moving body system 1, video streaming processing is performed separately from the communication processing illustrated in FIG. 12. When the user authentication of the drone-side information processing device 200 and the user-side information processing device 50 is completed, the drone-side information processing device 200 periodically transmits a video captured by a camera to the server device 40. The drone-side control application of the drone-side information processing device 200 transmits the video to the server device 40 via the drone-side service application. The server device 40 transmits the received video to the user-side information processing device 50. The server device 40 transmits the video to the user-side control application via the user-side service application.

As described above, in the embodiment of the present disclosure, the video streaming is performed separately from the vehicle operation of the drone 100 and the state acquisition thereof.

It is noted that, in FIG. 12, after the user authentication, the user-side information processing device 50 performs the vehicle operation of the drone 100, but the present disclosure is not limited thereto. After the user authentication, the user-side information processing device 50 may acquire the state of the drone 100.

Furthermore, in FIG. 12, the drone-side information processing device 200 returns the information on the state of the drone 100 to the server device 40 in response to a state acquisition request, but the present disclosure is not limited thereto. For example, the drone-side information processing device 200 may periodically transmit the information on the state of the drone 100 to the server device 40. In this manner, the drone-side information processing device 200 may transmit the information on the state of the drone 100 to the server device 40 regardless of the state acquisition request.

4. Modification

First Modification

As described above, the flight of the drone 100 is regulated by laws, regulations, and the like. For example, a flyable range including the altitude of the drone 100 can be determined. Furthermore, depending on the flight range, the radio communication method that can be used by the drone 100 (the drone-side information processing device 200 in the embodiment of the present disclosure) for communication may be limited. For example, there may be a limitation on a range in which the drone 100 can perform communication using 5G or LTE.

Furthermore, there is a case in which a time during which the drone 100 can fly is limited. For example, the flight of the drone 100 may be limited to a time during which the user is permitted to fly the drone 100.

Therefore, the moving body system 1 according to the first modification of the embodiment of the present disclosure has a mechanism configured to limit the flight of the drone 100 according to this limitation.

For example, the server device 40 permits a connection from the drone-side information processing device 200 mounted on the drone 100 that has obtained flight permission, and rejects a connection from the drone-side information processing device 200 mounted on the drone 100 that has not obtained flight permission.

For example, at the time of the user authentication performed in Step S102 in FIG. 12, the server device 40 determines whether to permit login (connection) of the drone-side information processing device 200 based on the limitation information (for example, information on limitations on the flight range and the flight time) on the flight of the drone 100.

Furthermore, for example, at the time of the vehicle authentication in Step S106 in FIG. 12, the server device 40 may determine whether the drone 100 can fly and transmit information on the vehicle operation to the drone-side information processing device 200 according to the determination result.

For example, at the time of the vehicle authentication, the server device 40 determines whether the drone 100 can fly based on the limitation information on the flight of the drone 100, and transmits the information on the vehicle operation to the drone-side information processing device 200 when the drone can fly.

On the other hand, when the drone 100 cannot fly, the server device 40 instructs the drone-side information processing device 200 to control the drone 100 so that the drone 100 can fly. For example, when the drone 100 is flying outside the flyable range, the server device 40 instructs the drone-side information processing device 200 to move the drone 100 to the flyable range.

Alternatively, for example, when it is desirable to end the flight of the drone 100, such as a case in which the drone 100 is caused to fly beyond the flight permitted time, the server device 40 instructs the drone-side information processing device 200 to end the flight of the drone 100.

As described above, when the server device 40 instructs the drone-side information processing device 200 to perform an operation different from the vehicle operation of the user-side information processing device 50, the server device 40 can notify the user-side information processing device 50 of the fact. In this case, the user-side information processing device 50 can notify the user of the fact indicating that an operation different from the operation by the user has been performed on the drone 100.

Furthermore, when there is a limitation on the radio communication method that can be used by the drone 100 depending on the flight range, the server device 40 notifies the drone-side information processing device 200 of switching of the radio communication method according to the current location of the drone 100.

As a result, the drone-side information processing device 200 can be dynamically switched to the available radio communication method according to the flight range, and can stably fly the drone 100 while complying with the rules.

It is noted that, when there are a plurality of radio communication methods that can be used by the drone 100, the server device 40 selects, for example, a radio communication method having the highest communication quality. Alternatively, the server device 40 may select a radio communication method having a wide available range. Furthermore, the server device 40 may select the radio communication method according to the flight path of the drone 100, the remaining battery amount thereof, and the like.

The pieces of limitation information such as the above-described flight range, flight time, and available radio communication method can be managed by, for example, the server device 40. The server device 40 can acquire the latest limitation information via, for example, the network N. As a result, the server device 40 can always manage new limitation information.

It is noted that, here, the server device 40 determines whether the drone 100 can fly based on the limitation information, but the present disclosure is not limited thereto. For example, the drone-side information processing device 200 may acquire the limitation information from the server device 40 and determine whether the drone 100 can fly. In this case as well, the server device 40 can acquire the latest limitation information by managing the limitation information by the server device 40.

Second Modification

The user-side information processing device 50 can change, for example, a display method of an operation screen (a control UI) of the drone 100 according to the state of the drone 100. For example, the user-side information processing device 50 highlights at least a part of a display image displayed on a monitor according to the state of the drone 100.

(Case 1: Flight Range)

Figure 13:
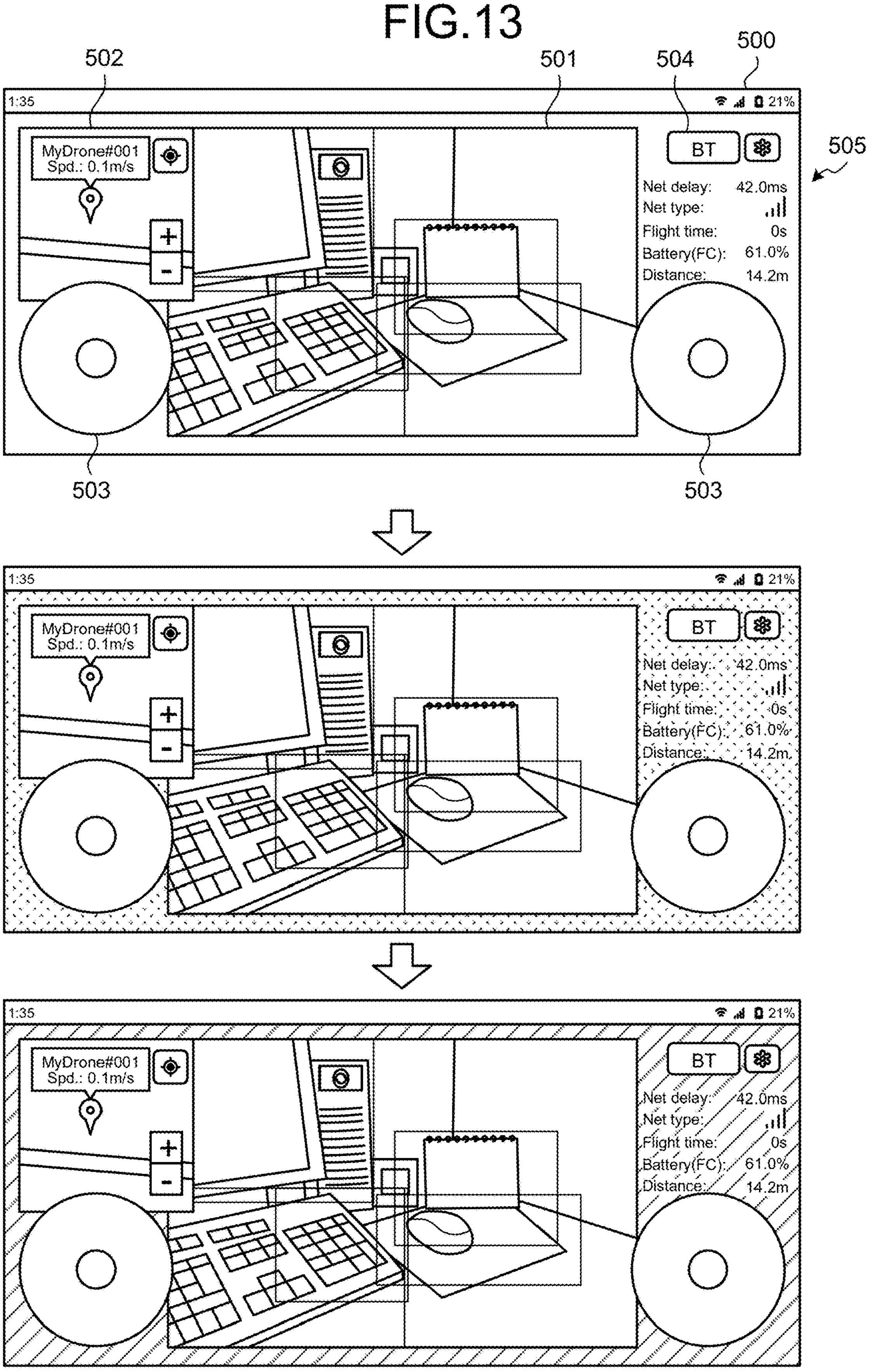
FIG. 13 is a diagram illustrating an example of a display image according to a second modification of the embodiment of the present disclosure.

FIG. 13 is a diagram illustrating an example of a display image according to a second modification of the embodiment of the present disclosure. Here, the user-side information processing device 50 highlights a display image according to the location of the drone 100 in the flight range in which the drone 100 can fly.

As illustrated in the upper diagram of FIG. 13, in a case where the drone 100 is located within a predetermined area of the flight range, the user-side information processing device 50 displays a display image with a normal background color (a first background color such as a white color) on the monitor. Here, the predetermined area of the flight range indicates, for example, an area within a certain distance from a boundary line of the flight range.

As illustrated in the middle diagram of FIG. 13, in a case where the drone 100 is within the flight range and moves out of the predetermined area, the user-side information processing device 50 changes the background color of the display image from the first background color to a second background color (for example, a yellow color) and displays the changed background color on the monitor. That is, in a case where the drone 100 approaches the outside of the flight range, the user-side information processing device 50 highlights the background color with a color different from the normal background color. As a result, the user-side information processing device 50 can notify the user that the drone 100 may be out of the flight range in an easy-to-understand manner.

As illustrated in the lower diagram of FIG. 13, in a case where the drone 100 moves out of the flight range, the user-side information processing device 50 changes the background color from the second background color to a third background color (for example, a red color) and displays the display image on the monitor. That is, in a case where the drone 100 exists outside the flight range, or in a case where the drone 100 approaches an area outside the flight range, the user-side information processing device 50 highlights the background color with a color different from the normal background color. As a result, the user-side information processing device 50 can notify the user that the drone 100 is located outside the flight range in an easy-to-understand manner.

(Case 2: Distance to Drone 100)

The user-side information processing device 50 can change the display method of the display image according to a distance between the user-side information processing device 50, in other words, the user and the drone 100. When the distance between the drone 100 and the user is long, there is a high possibility that the user steers the drone 100 out of his or her visual range. On the other hand, when the distance between the drone 100 and the user is short, there is a high possibility that the user steers the drone 100 within his or her visual range.

Therefore, by changing the display method of the display image according to the distance between the user and the drone 100, the user-side information processing device 50 can clearly notify the user whether the drone 100 is in the state of in-visual flight or non-visual flight.

For example, in a case where the distance between the drone 100 and the user-side information processing device 50 is less than a first threshold value, the user-side information processing device 50 displays the display image with a normal background color (for example, a white color) on the monitor. In other words, the user-side information processing device 50 displays the display image with the normal background color in a case where the drone 100 is in the state of the in-visual flight.

On the other hand, in a case where the distance between the drone 100 and the user-side information processing device 50 is equal to or greater than the first threshold value, the user-side information processing device 50 displays the display image with a predetermined background color (for example, a yellow color) on the monitor. That is, in a case where the drone 100 is in the state of non-visual flight, the user-side information processing device 50 highlights the background color with a color different from the normal background color. As a result, the user-side information processing device 50 can notify the user that the drone 100 is in the state of non-visual flight in an easy-to-understand manner.

It is noted that the first threshold value described above may be a preset value or a value set by the user. Furthermore, the first threshold value may be, for example, a value corresponding to a flight location (for example, indoor or outdoor, an urban area or a suburb, a place with a lot of nature such as a mountain or a sea, or the like) of the drone 100.

(Case 3: Radio Communication Method)

The user-side information processing device 50 can change the display method of the display image depending on the radio communication method selected by the drone-side information processing device 200. That is, the user-side information processing device 50 can change the display method of the display image depending on a network connection method of the drone 100.

As described above, a legally usable radio communication method of the drone 100 may be different depending on the flight range. Therefore, by changing the display method of the display image depending on the radio communication method selected by the drone-side information processing device 200, the user-side information processing device 50 can notify the user that the radio communication method having no legal problem is selected in an easy-to-understand manner.

For example, in a case where the drone-side information processing device 200 is connected to the network N by using a wireless local area network (WLAN), the user-side information processing device 50 displays the display image with a normal background color (for example, a white color) on the monitor.

For example, in a case where the drone-side information processing device 200 is connected to the network N by using LTE, the user-side information processing device 50 displays the display image with a predetermined background color (for example, a yellow color) on the monitor.

For example, in a case where the drone-side information processing device 200 is connected to the network N by using a 5th generation mobile communication system (5G), the user-side information processing device 50 displays the display image with a predetermined background color (for example, a red color) on the monitor.

For example, in a case where the drone-side information processing device 200 is connected to the network N by using a low power wide area (LPWA), the user-side information processing device 50 displays the display image with a predetermined background color (for example, a purple color) on the monitor.

It is noted that the radio communication method described here is an example, and the drone-side information processing device 200 may be connected to the network N by a method other than the radio communication methods described above (for example, Bluetooth or the like).

(Case 4: Remaining Battery Amount)

The user-side information processing device 50 can change the display method of the display image depending on the remaining battery amount of the drone 100. As a result, the user-side information processing device 50 can notify the user of a remaining flyable time of the drone 100 in an easy-to-understand manner.

For example, in a case where the remaining battery amount of the drone 100 is equal to or greater than a second threshold value (for example, 50%), the user-side information processing device 50 displays the display image with a normal background color (for example, a white color) on the monitor.

For example, in a case where the remaining battery amount of the drone 100 is less than the second threshold value (for example, 50%) and equal to or greater than a third threshold value (for example, 10%) (second threshold value>third threshold value), the user-side information processing device 50 displays the display image with a predetermined background color (for example, a yellow color) on the monitor.

For example, in a case where the remaining battery amount of the drone 100 is less than the third threshold value (for example, 10%), the user-side information processing device 50 displays the display image with a predetermined background color (for example, a red color) on the monitor.

It is noted that each of the above-described background colors (for example, white, yellow, red, and purple colors) is an example, and the user-side information processing device 50 may highlight the display image by using a background color other than these colors. Alternatively, the user-side information processing device 50 may highlight the display image by a method other than the method of changing the background color. For example, the user-side information processing device 50 can highlight the display image by blinking a partial area (an image) of the display image or displaying a character string. Alternatively, the user-side information processing device 50 may call the user's attention to the state of the drone 100 by using a voice, a warning sound, or the like.

Further, each case described above is an example. The user-side information processing device 50 may highlight the display image by, for example, combining the respective cases. For example, the user-side information processing device 50 may display the display image with a red background color in a case where the distance between the user-side information processing device 50 and the drone 100 is equal to or greater than the first threshold value, and the drone 100 is located outside the predetermined area in the flight range. In a case where the user performs the non-visual flight of the drone 100, there is a higher possibility that the drone 100 flies out of the flight range as compared with the in-visual flight.

Therefore, in a case where the drone 100 approaches a flight prohibited area during the non-visual flight, the user-side information processing device 50 presents the fact to the user in a more emphasized manner than a case in which the drone 100 is in the state of the in-visual flight. As a result, the user can operate the drone 100 so as not to allow the drone 100 to go out of the flight range even during the non-visual flight, and can fly the drone 100 more safely.

In this manner, the user-side information processing device 50 may change the display method of the display image by combining the respective cases, or may change the display method of the display image for each case.

Third Modification

In the above-described embodiment, it has been mainly described that the user remotely operates the drone 100, but for example, the drone 100 may automatically fly along a predetermined flight route. The drone-side information processing device 200 sets, for example, a flight route to a destination designated by the user-side information processing device 50. The drone 100 flies along the flight route set by the drone-side information processing device 200. It is noted that the user-side information processing device 50 can designate a plurality of destinations including a transit point.

Here, the drone-side information processing device 200 according to the third modification of the embodiment of the present disclosure sets the flight route in consideration of, for example, a remaining battery amount of the drone 100 in addition to the destination designated by the user-side information processing device 50.

As a result, the drone 100 can fly along the flight route to the destination without causing battery exhaustion in the middle of the flight route.

Figure 14:
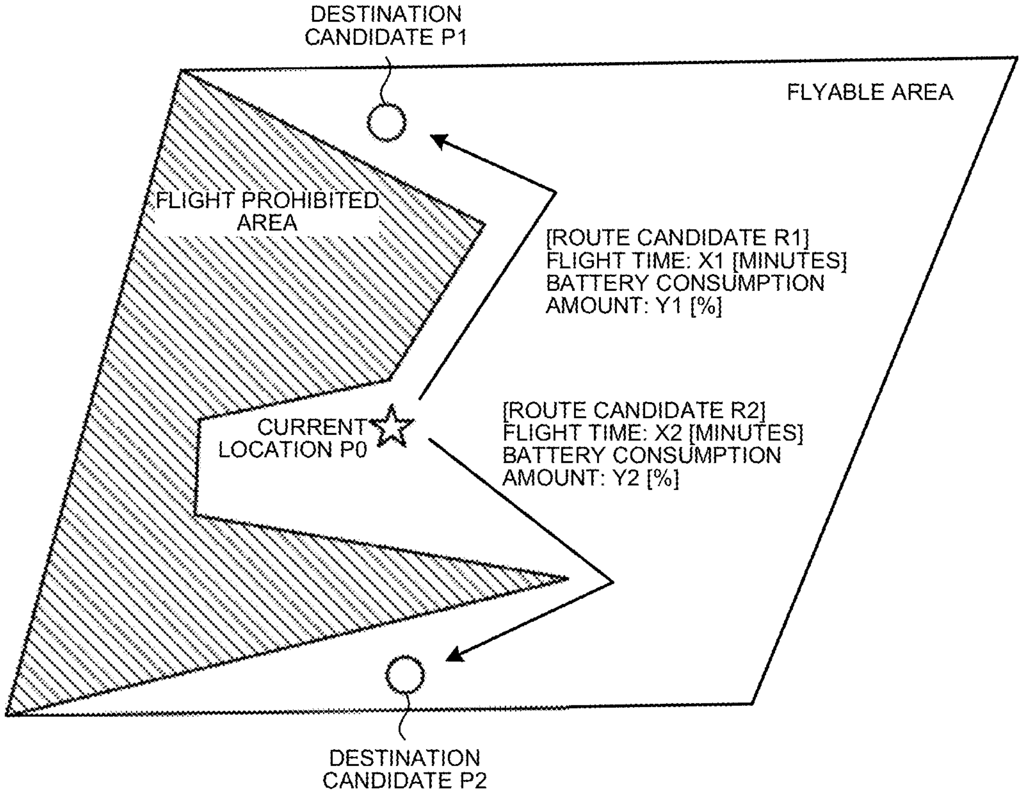
FIG. 14 is a diagram illustrating an example of a route candidate according to a third modification of the embodiment of the present disclosure.

FIG. 14 is a diagram illustrating an example of a route candidate according to the third modification of the embodiment of the present disclosure.

For example, the drone-side information processing device 200 calculates a plurality of route candidates R1 and R2 based on a current location P0 and destination candidates P1 and P2. Here, the destination candidates P1 and P2 are a plurality of destinations designated by the user-side information processing device 50. Alternatively, either of the destination candidates P1 and P2 may be a flight start point of the drone 100.

The drone-side information processing device 200 calculates the route candidates R1 and R2 in consideration of the flight range (the flyable area in FIG. 14) and a flight prohibited area of the drone 100. For example, the drone-side information processing device 200 determines, as the route candidates R1 and R2, routes along which the drone 100 does not fly in the flight prohibited area and reaches the destination candidates P1 and P2 in the shortest time.

It is noted that the flyable area and the flight prohibited area here are areas that define a range in which the drone 100 can fly or is prohibited from flying in a three-dimensional space including a height.

The drone-side information processing device 200 calculates flight times X1 and X2 [minutes] when the drone 100 flies along the route candidates R1 and R2 based on weather information and wind direction information of the route candidates R1 and R2 along which the drone 100 flies.

Here, the drone-side information processing device 200 acquires, for example, the weather information and the wind direction information from the server device 40. The server device 40 generates the weather information and the wind direction information described above based on information acquired from another drone 100 that flies in the same flyable area as that of the drone-side information processing device 200 and information on the weather acquired from an external server or the like via the network N.

The server device 40 generates a weather map including, for example, information regarding the weather at each point as the weather information. The server device 40 generates, as the wind direction information, for example, a wind direction map including information related to a wind direction, wind strength, and the like at each point.

The drone-side information processing device 200 calculates battery consumption amounts Y1 and Y2 [%] in a case where the drone 100 flies along the route candidates R1 and R2, for example, according to the weather information, the wind direction information, and radio wave environment information indicating a radio wave status of the route candidates R1 and R2.

Here, the drone-side information processing device 200 acquires the radio wave environment information from the server device 40. For example, the server device 40 generates the radio wave environment information based on information on the base station 60 disposed in the flyable area or the flight prohibited area.

The server device 40 acquires, for example, the information on the base station 60 (information on an installation place, a communication area, and the like of the base station 60) from a network operator. Alternatively, the server device 40 may acquire information on the radio wave status from another drone 100 flying in the same flyable area as that of the drone-side information processing device 200. The server device 40 generates a radio wave environment map including, for example, the information indicating the radio wave status at each point as the radio wave environment information.

The drone-side information processing device 200 determines the flight route of the drone 100 from the calculated route candidates R1 and R2. The drone-side information processing device 200 determines, as the flight route, a route candidate in which the drone 100 is flyable with the currently remaining battery based on the remaining battery amount of the drone 100.

The drone-side information processing device 200 may transmit the calculated route candidates R1 and R2 to the user-side information processing device 50, and the user may determine the flight route of the drone 100 from the route candidates R1 and R2.

At this time, the drone-side information processing device 200 may transmit, to the user-side information processing device 50, a route candidate in which the drone 100 is flyable with the currently remaining battery based on the remaining battery amount of the drone 100.

Alternatively, the user-side information processing device 50 may present, to the user, the route candidate in which the drone 100 is flyable with the currently remaining battery based on the remaining battery amount of the drone 100, or may present, to the user, both of the route candidates including the remaining battery amount of the drone 100 and the battery consumption amount.

The drone-side information processing device 200 controls the flight of the drone 100 so as to enable the drone 100 to fly along the determined flight route.

It is noted that, here, the drone-side information processing device 200 calculates the route candidates R1 and R2 of the two destination candidates P1 and P2, but the present disclosure is not limited thereto. The number of destination candidates obtained by allowing the drone-side information processing device 200 to calculate route candidates may be one or three or more.

In addition, here, the drone-side information processing device 200 calculates the route candidate having the shortest distance to the destination candidate, but the present disclosure is not limited thereto. The drone-side information processing device 200 may calculate a route candidate having the shortest flight time, a route candidate having the minimum battery consumption amount, a route candidate having the best radio wave state, and the like using, for example, the weather information, the wind direction information, the radio wave environment information, and the like described above.

For example, the drone-side information processing device 200 can calculate the route candidate in consideration of the vehicle speed of the drone 100 from the wind direction, the strength of the wind, and the like. Alternatively, the drone-side information processing device 200 can calculate the route candidate including a route having a communication state as good as possible in consideration of, for example, the radio wave status.

In addition, here, the drone-side information processing device 200 calculates one route candidate for one destination candidate, but the present disclosure is not limited thereto. The drone-side information processing device 200 may calculate two or more route candidates for one destination candidate. For example, the drone-side information processing device 200 may calculate a plurality of route candidates for one destination candidate based on different viewpoints such as a route candidate having the shortest distance, a route candidate having the minimum battery consumption amount, and a route candidate having the best radio wave state.

In addition, here, the drone-side information processing device 200 determines the flight route, but the present disclosure is not limited thereto. For example, the server device 40 may automatically select the flight route of the drone 100.

Fourth Modification

In the above-described embodiment, the drone-side information processing device 200 performs streaming transmission of a video captured by a camera, but the present disclosure is not limited thereto. For example, the drone-side information processing device 200 may upload a video to the server device 40 in a case where the radio wave state is good.

Alternatively, the drone-side information processing device 200 may upload a captured image (including a moving image and a still image) captured separately from video streaming to the server device 40 in a case where the radio wave state is good. It is noted that, in this case, it is assumed that the drone-side information processing device 200 captures the captured image based on an instruction from the user.

As described above, the drone-side information processing device 200 uploads the image to the server device 40 only in a case where the radio wave status is good, so that retransmission of an image file due to interruption of the radio wave can be suppressed. As a result, the drone-side information processing device 200 can further reduce an increase in power consumption and an increase in communication costs.

For example, the drone-side information processing device 200 divides captured image data captured during the flight of the drone 100. The drone-side information processing device 200 stores the divided captured image data in the drone-side information processing device 200 as a divided file.

Based on the flight route and the radio wave environment information during flight, the drone-side information processing device 200 calculates a time during which uploading can be performed without radio wave interruption. The drone-side information processing device 200 calculates the number of divided files that can be uploaded in the calculated time. The drone-side information processing device 200 uploads the calculated number of divided files to the server device 40 within the calculated time.

It is noted that the drone-side information processing device 200 may change a transmission rate and a transmission method of the divided file according to the calculated time. As a result, the drone-side information processing device 200 can upload a larger number of divided files even in a case where the time during which uploading can be performed without causing radio wave interruption is short.

Fifth Modification

In the above-described embodiment, the drone-side information processing device 200 displays various types of information on the monitor. At this time, the drone-side information processing device 200 adjusts the luminance of the monitor according to the state of the drone 100.

For example, the drone-side information processing device 200 adjusts the luminance of the monitor according to whether the drone 100 is in a flight state or in a landing state in which the drone has landed on the ground. More specifically, in a case where the drone 100 is in the flight state, the drone-side information processing device 200 sets the luminance of the monitor to be lower than that in a case where the drone is in the landing state. In a case where the drone 100 is in the flight state, the drone-side information processing device 200 may turn off the monitor (screen off).

In a case where the drone 100 is in the flight state, it is considered that a screen operation by the user is not performed. Therefore, in a case where the drone 100 is in the flight state, the drone-side information processing device 200 reduces the luminance of the monitor or powers off the monitor. On the other hand, in a case where the drone 100 is in the landing state, there is a possibility that the screen operation is performed by the user. Therefore, in a case where the drone 100 is in the landing state, the drone-side information processing device 200 increases the luminance of the monitor. As a result, the drone-side information processing device 200 can reduce power consumption during flight and suppress heat generation.

The drone-side information processing device 200 determines the flight state of the drone 100 based on, for example, throttle information of the drone 100. For example, in a case where the throttle of the drone 100 is increased, the drone-side information processing device 200 determines that the drone 100 is in the flight state. When the drone 100 is not in the flight state, the drone-side information processing device 200 determines that the drone 100 is in the landing state.

Alternatively, for example, the drone-side information processing device 200 may determine the flight state of the drone 100 according to whether a motor of the drone 100 is driven. For example, in a case where the motor of the drone 100 is driven, the drone-side information processing device 200 determines that the drone 100 is in the flight state. In a case where the motor of the drone 100 is not driven, the drone-side information processing device 200 determines that the drone 100 is in the landing state.

Alternatively, for example, the drone-side information processing device 200 may determine the flight state of the drone 100 according to a detection result of a proximity sensor mounted on the drone 100. This proximity sensor detects, for example, whether a distance to the ground is equal to or less than a certain value.

For example, in a case where the proximity sensor detects that the distance to the ground is greater than the certain value, the drone-side information processing device 200 determines that the drone 100 is in the flight state. For example, in a case where the proximity sensor detects that the distance to the ground is equal to or less than the certain value, the drone-side information processing device 200 determines that the drone 100 is in the landing state.

It is noted that, here, the drone-side information processing device 200 adjusts the luminance of the monitor according to the flight state of the drone 100, but the present disclosure is not limited thereto. The drone-side information processing device 200 may adjust the luminance of the monitor according to an application being executed in addition to the flight state of the drone 100.

For example, it is assumed that the drone-side information processing device 200 provides a service such as video chat, that is, a video chat application or the like is executed on the drone-side information processing device 200. In this case, the drone-side information processing device 200 increases the luminance of the monitor as in the landing state even if the drone 100 is in the flight state.

More specifically, for example, in a case where a specific application is executed and the moving speed of the drone 100 is less than a fourth threshold value, the drone-side information processing device 200 sets the luminance of the monitor to be lower than that in a case where the moving speed is equal to or greater than the fourth threshold value. For example, in a case where a specific application is executed, even if the drone 100 is in the flight state, if the drone 100 is in a stationary state in which the drone 100 is stationary in the air, the drone-side information processing device 200 does not lower the luminance of the monitor and maintains a high luminance state.

As a result, even if the drone 100 is in the flight state, in a case where the user uses a specific application of the drone-side information processing device 200, the drone-side information processing device 200 does not lower the luminance of the monitor. As a result, the drone-side information processing device 200 can present a more easily viewable screen to the user.

It is noted that, in a case where the operation of the specific application is ended such as a case in which the user ends the video chat, the drone-side information processing device 200 reduces the luminance of the monitor even if the drone 100 is in the stationary state.

As a result, the drone-side information processing device 200 can present an easily viewable screen to the user even if the drone 100 is flying in the state in which the specific application is in operation.

Furthermore, in a case where the specific application is not operated, the drone-side information processing device 200 reduces the luminance of the monitor during flight or turns off the monitor. As a result, the drone-side information processing device 200 can further reduce power consumption during flight, and can suppress heat generation.

It is noted that the specific application is not limited to the video chat. For example, the specific application may be any application that can be used by the user in a state in which the drone 100 is stationary or moving at a constant speed or less, and may be, for example, a moving image reproduction application or the like.

5. Other Embodiments

The above-described embodiments and modifications thereof are examples, and various modifications and applications are possible.

In the above-described embodiments and modifications thereof, the number of sets including the moving body device 10 and the user-side information processing device 50 connected to the server device 40 is one, but the present disclosure is not limited thereto. A plurality of sets including the moving body device 10 and the user-side information processing device 50 may be connected to the server device 40. In this manner, the server device 40 can control (relay) remote operations for the plurality of moving body devices 10.

In the above-described embodiments and modifications thereof, one user-side information processing device 50 remotely operates one moving body device 10, but the present disclosure is not limited thereto. One user-side information processing device 50 may remotely operate each of the plurality of moving body devices 10.

In this case, for example, the user-side information processing device 50 presents, to the user, a screen for selecting the moving body device 10 (or the drone 100) to be remotely operated. The user determines the drone 100 to be remotely operated from among a plurality of moving body devices 10 (or the drones 100). For example, the user registers information on the moving body device 10 (for example, the drone ID) in the user-side information processing device 50 and the server device 40, thereby adding the moving body device 10 to be remotely operated.

In the above-described embodiments and the respective modifications, one drone-side information processing device 200 controls one drone 100, but the present disclosure is not limited thereto. For example, the drone-side information processing device 200 may control the plurality of drones 100. In this case, for example, the drone-side information processing device 200 is mounted by the user on the external device 300 mounted on the drone 100 to be controlled among the plurality of drones 100. In this manner, when the user replaces the drone-side information processing device 200, the drone-side information processing device 200 can control the plurality of drones 100.

The control device that controls the server device 40 of the present embodiment may be implemented by a dedicated computer system or may be implemented by a general-purpose computer system.

For example, a program for executing the above-described operation is stored and distributed in a computer-readable recording medium such as an optical disk, a semiconductor memory, a magnetic tape, or a flexible disk. Then, for example, the program is installed in a computer, and the above-described processing is executed to configure the control device. At this time, the control device may be a device (for example, a personal computer) outside the server device 40. Furthermore, the control device may be a device (for example, the control unit 405) inside the server device 40.

In addition, the program may be stored in a disk device included in a server device on a network such as the Internet so that the program can be downloaded to a computer. In addition, the above-described functions may be implemented by cooperation of an operating system (OS) and application software. In this case, a portion other than the OS may be stored in a medium and distributed, or the portion other than the OS may be stored in the server device and downloaded to the computer.

Further, among the pieces of processing described in the above embodiments, all or a part of the processing described as being performed automatically can be manually performed, or all or a part of the processing described as being performed manually can be automatically performed by a known method. In addition, the processing procedure, specific name, and information including various data and parameters illustrated in the document and the drawings can be freely and selectively changed unless otherwise specified. For example, the various types of information illustrated in each drawing are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in any unit depending on various loads, usage conditions, and the like. It is noted that this configuration by distribution and integration may be performed dynamically.

In addition, the above-described embodiments can be appropriately combined in an area in which the processing contents do not contradict each other. Furthermore, the order of each step illustrated in the flowchart and the sequence diagram of the above-described embodiment can be changed as appropriate.

Furthermore, for example, the present embodiment can be implemented as any configuration constituting a device or a system, such as a processor serving as a system large scale integration (LSI) or the like, a module using a plurality of processors or the like, a unit using a plurality of modules or the like, a set obtained by further adding other functions to the unit, or the like (that is, a configuration of a part of the device).

It is noted that, in the present embodiment, the system means a set of a plurality of components (devices, modules (parts), and the like), and it does not matter whether all the components are in the same housing. Therefore, a plurality of devices housed in separate housings and connected to each other via a network and one device in which a plurality of modules are housed in one housing are both systems. For example, the server device 40 of the present embodiment can be implemented as one system.

Furthermore, for example, the present embodiment can adopt a configuration of cloud computing in which one function is shared and processed by a plurality of devices in cooperation via a network.

6. Conclusion

Although embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

Furthermore, the effects of each embodiment described in the present specification are merely examples and are not limited, and other effects may be obtained.

It is noted that the present technology can also have the following configurations.

(1)

A device mounted on a moving body and configured to control the moving body, the device comprising:

a holding unit configured to hold an information processing device configured to control the moving body; and a control unit configured to acquire control information used to control the moving body from the information processing device, and to control the moving body based on the control information.

(2)

The device according to (1), wherein the control unit is configured to acquire, via a first application operated by the information processing device, the control information from a second application operated by the information processing device, and the first application is an application that does not accept a change by a user.

(3)

The device according to (2), wherein the first application operates at an application framework layer of the information processing device.

(4)

The device according to any one of (1) to (3), further comprising a conversion unit configured to convert the control information into a control signal to be output to a drive control unit configured to control a drive unit of the moving body.

(5)

The device according to (4), wherein the conversion unit is configured to convert the control information into the control signal which is a PWM signal.

(6)

The device according to any one of (1) to (3), wherein the control unit is configured to control, based on the control information, a movement control unit of the moving body.

(7)

A system configured to control a moving body, the system comprising:

a user-side information processing device configured to receive an operation on the moving body from a user;

a server device configured to acquire operation information on the operation by the user from the user-side information processing device;

a moving body-side information processing device configured to acquire the operation information from the server device, and to generate, based on the operation information, control information used to control the moving body; and a device configured to acquire the control information from the moving body-side information processing device, and to control the moving body based on the control information, wherein the device is configured to be mounted on the moving body, and to further include a holding unit configured to hold the moving body-side information processing device, and wherein the moving body-side information processing device is configured to acquire, via the device, information on the moving body, and to transmit, via the server device, the acquired information to the user-side information processing device.

(8)

The system according to (7), wherein the server device is configured to:

transmit, via a first application operated by the moving body-side information processing device, the operation information to a second application operated by the moving body-side information processing device; and acquire, via the first application, the information on the moving body from the second application, and wherein the first application is an application that does not accept a change by a user.

(9)

The system according to (8), wherein the first application operates at an application framework layer of the moving body-side information processing device.

(10)

The system according to any one of (7) to (9), wherein the server device is configured to:

acquire, via a third application operated by the user-side information processing device, the operation information from a fourth application operated by the user-side information processing device; and transmit, via the third application, the information on the moving body to the fourth application, and wherein the third application is an application that does not accept a change by a user.

(11)

The system according to (10), wherein the third application operates at an application framework layer of the user-side information processing device.

REFERENCE SIGNS LIST

1 MOVING BODY SYSTEM
10 MOVING BODY DEVICE
20 CONTROL DEVICE
40 SERVER DEVICE
50 USER-SIDE INFORMATION PROCESSING DEVICE
60 BASE STATION
100 DRONE
300 EXTERNAL DEVICE
302, 405 CONTROL UNIT
303 CONVERSION UNIT
310 HOLDING UNIT
400 STREAMING UNIT
401 VEHICLE OPERATION UNIT
402 VEHICLE INFORMATION STORAGE UNIT
403 STATE MANAGEMENT UNIT
404 COMMUNICATION UNIT
406 STORAGE UNIT
407 APPLICATION STORAGE UNIT

The invention claimed is:

1. An external device mounted on a moving body and configured to control the moving body, the external device comprising:

a holder configured to hold an information processing device configured to generate control information for the moving body, the external device being external to the information processing device; and circuitry configured to act as a bidirectional communication relay between the moving body and the information processing device by (i) acquiring the control information from a first application operated at an application framework layer of the information processing device, the first application not being able to be rewritten by an end user;

(ii) executing the control of the moving body based on the control information acquired from the first application operated at the application framework layer of the information processing device;

(iii) acquiring information on the moving body from the moving body; and (iv) providing the information on the moving body to the first application operated at the application framework layer of the information processing device.

2. The device according to claim 1, wherein the circuitry is configured to acquire, via the first application operated at the application framework layer of the information processing device, the control information from a second application operated by the information processing device.

3. The device according to claim 1, wherein the circuitry is configured to convert the control information into a control signal to be output to a drive controller configured to control a drive unit of the moving body.

4. The device according to claim 3, wherein the control signal converted from the control information is a PWM signal.

5. The device according to claim 1, wherein the circuitry is configured to control, based on the control information, a movement controller of the moving body.

6. A system configured to control a moving body, the system comprising:

a user-side information processing device configured to receive an operation on the moving body from a user;

a server device configured to acquire operation information on the operation by the user from the user-side information processing device;

a moving body-side information processing device configured to acquire the operation information from the server device, operate a first application at an application framework layer, and generate, based on the operation information, control information for the moving body; and an external device configured to be mounted on the moving body and including a holder configured to hold the moving body-side information processing device, the external device being external to the moving body-side information processing device; and circuitry configured to act as a bidirectional communication relay between the moving body and the moving body-side information processing device by (i) acquiring the control information from the first application operated at the application framework layer of the moving body-side information processing device, the first application not being able to be rewritten by an end user, (ii) executing the control of the moving body based on the control information acquired from the first application operated at the application framework layer of the moving body-side information processing device, (iii) acquiring information on the moving body from the moving body, and (iv) providing the information on the moving body to the first application operated at the application framework layer of the moving body-side information processing device, wherein the moving body-side information processing device is configured to acquire the information on the moving body from the external device, and transmit, via the server device, the information on the moving body acquired from the external device to the user-side information processing device.

7. The system according to claim 6, wherein the server device is configured to:

transmit, via the first application operated at the application framework layer of the moving body-side information processing device, the operation information to a second application operated by the moving body-side information processing device; and acquire, via the first application operated at the application framework layer of the moving body-side information processing device, the information on the moving body from the second application.

8. The system according to claim 7, wherein the moving body-side information processing device is configured to operate the second application at an application layer, and the application layer is able to be rewritten by an end user.

9. The system according to claim 6, wherein the server device is configured to:

acquire, via a third application operated by the user-side information processing device, the operation information from a fourth application operated by the user-side information processing device; and transmit, via the third application, the information on the moving body to the fourth application, and wherein the third application is an application that is not able to be rewritten by an end user.

10. The system according to claim 9, wherein the third application is operated at an application framework layer of the user-side information processing device.

11. The system according to claim 6, wherein the moving body-side information processing device includes an application layer, a standard library layer, and a kernel layer.

12. The system according to claim 11, wherein the standard library layer and the kernel layer are not able to be rewritten by an end user, and the application layer is able to be rewritten by the end user.

13. The system according to claim 6, wherein the first application is configured to limit access to the circuitry to the specific moving body-side information processing device in which the first application is installed in advance.

* * * * *